(12) United States Patent
Park et al.

(10) Patent No.: US 8,433,002 B2
(45) Date of Patent: Apr. 30, 2013

(54) METHODS AND SYSTEMS FOR INITIAL FCH PROCESSING

(75) Inventors: Jong Hyeon Park, San Jose, CA (US); Bok Tae Sim, San Ramon, CA (US); Ju Won Park, San Jose, CA (US); Tae Ryun Chang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/247,589

(22) Filed: Sep. 28, 2011

(65) Prior Publication Data

US 2012/0014428 A1 Jan. 19, 2012

Related U.S. Application Data

(62) Division of application No. 12/123,406, filed on May 19, 2008, now Pat. No. 8,059,759.

(51) Int. Cl.
*H04L 27/06* (2006.01)

(52) U.S. Cl.
USPC ............................. 375/340; 375/229; 375/260

(58) Field of Classification Search ................... 375/260, 375/316, 340, 229
See application file for complete search history.

(56) References Cited

U.S. PATENT DOCUMENTS

| 5,852,630 | A * | 12/1998 | Langberg et al. ............. 375/219 |
| 7,428,267 | B2 | 9/2008 | Lee et al. | |
| 8,059,759 | B2 | 11/2011 | Park et al. | |
| 2003/0227866 | A1* | 12/2003 | Yamaguchi ................... 370/208 |
| 2005/0041626 | A1 | 2/2005 | Tiirola et al. | |
| 2006/0093074 | A1 | 5/2006 | Chang et al. | |
| 2006/0187876 | A1 | 8/2006 | Schmidl et al. | |
| 2007/0086474 | A1 | 4/2007 | Lee et al. | |
| 2007/0211832 | A1 | 9/2007 | Lee et al. | |
| 2008/0043712 | A1 | 2/2008 | Hart et al. | |
| 2008/0075185 | A1* | 3/2008 | Park et al. ..................... 375/260 |
| 2008/0181325 | A1* | 7/2008 | Park et al. ..................... 375/260 |
| 2009/0067519 | A1 | 3/2009 | Baggen et al. | |
| 2009/0175394 | A1* | 7/2009 | Park et al. ..................... 375/362 |

FOREIGN PATENT DOCUMENTS

| EP | 1826972 | 8/2007 |
| WO | WO2008044888 | 4/2008 |

OTHER PUBLICATIONS

Coleri, S. et al: "Channel Estimation Techniques Based on Pilot Arrangement in OFDM Systems," IEEE Transactions on Broadcasting, IEEE Service Center, Piscataway, NJ, US, vol. 48, No. 3, (Sep. 1, 2002), XP011070267, ISSN: 0018-9316 the whole document, Equations 8 and 13.
International Search Report—PCT/US2009/043500—International Search Authority, European Patent Office, Feb. 3, 2010.
Written Opinion—PCT/US2009/043500—ISA/EPO—Feb. 3, 2010.

* cited by examiner

*Primary Examiner* — Shuwang Liu
*Assistant Examiner* — David Huang
(74) *Attorney, Agent, or Firm* — Charles Chesney

(57) ABSTRACT

Methods and apparatus for initially decoding a frame control header (FCH) in an orthogonal frequency-division multiplexing (OFDM) or orthogonal frequency division multiple access (OFDMA) system in an effort to accurately determine the downlink frame prefix (DLFP) such that the remainder of an OFDM/A frame may be properly decoded are provided. Used, for example, when boosting factors applied in the transmitter to various elements of the OFDM/A frame and/or available pilots for the FCH are unknown, such methods may utilize a preamble channel estimate, the FCH pilots, or a combination thereof.

11 Claims, 16 Drawing Sheets

| FCH(DLFP)_Message_Format | |
|---|---|
| Used SCH bitmap:<br>A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br>        2048  1024  512  128<br> bit 0: SCH Group 0 0~11(12) 0~ 5(6) 0~4(5) 0(1)<br> bit 1: SCH Group 1 12~19( 8) 6~ 9(4) NA NA<br> bit 2: SCH Group 2 20~31(12) 10~15(6) 5~9(5) 1(1)<br> bit 3: SCH Group 3 32~39( 8) 16~19(4) NA NA<br> bit 4: SCH Group 4 40~51(12) 20~25(6) 10~14(5) 2(1)<br> bit 5: SCH Group 5 52~59( 8) 26~29(4) NA NA | 6 bits |
| Reserved: set to 0 | 1 bit |
| Repetition Coding Indication: on DL Map<br>No additional Rep=total1(0), 1 additional Rep=total2(1),<br>3 additional Rep=total4(2), 5 additional Rep=total6(3) | 2 bits |
| Coding Indication: on DL Map<br>DL Map shall be transmitted with QPSK at FEC rate 1/2<br>The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| DL Map Length:<br>Defines the length in slots of the DL Map msg that follows immediately the DLFP, after repetition code is applied. | 8 bits |
| Reserved: set to 0 | 4 bits |

FIG. 4B

METHODS AND SYSTEMS FOR INITIAL FCH PROCESSING

CROSS-REFERENCE TO RELATED APPLICATIONS

This is a divisional application of patent application Ser. No. 12/123,406 entitled "Methods and Systems for Initial FCH Processing" filed May 19, 2008, which is hereby expressly incorporated by reference herein.

TECHNICAL FIELD

Certain embodiments of the present disclosure generally relate to wireless communication and, more particularly, to initially decoding a frame control header (FCH) in orthogonal frequency-division multiplexing and orthogonal frequency division multiple access (OFDM/A) systems.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

Under the current versions of the IEEE 802.16x standards for the OFDM/A systems, every downlink subframe from a base station includes a preamble and a frame control header (FCH) following the preamble as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the downlink media access protocol, or DL MAP) and control information for the downlink data reception (e.g., allocation of the subcarriers in the current downlink frame).

Therefore, a receiver, such as a mobile station, first decodes the FCH to determine the position of the DL MAP, decodes the DL MAP of the corresponding position, and then extracts the data. Due to the nature of the information in the FCH, if the reception of FCH fails or the FCH is decoded incorrectly, the following downlink operations on the receiver side cannot be properly executed. Accordingly, proper interpretation of the FCH is important to OFDM and OFDMA system operation.

SUMMARY

Certain embodiments of the present disclosure generally relate to initial decoding of a frame control header (FCH) in an orthogonal frequency-division multiplexing (OFDM) system or orthogonal frequency division multiple access (OFDMA) system (e.g., OFDM/A systems) in an effort to accurately determine the downlink frame prefix (DLFP).

Certain embodiments of the present disclosure provide a method. The method generally includes determining an initial channel estimate (CE) based on a preamble of a signal received via a wireless channel; generating an interpolated CE based on the initial CE by estimating frequency responses of the channel for other subcarriers not included in the initial CE; extracting pilot and data subcarriers from an FCH of the signal; from the interpolated CE, extracting channel estimates corresponding to the extracted FCH pilot and data subcarriers; dividing the extracted FCH pilot subcarriers by the extracted corresponding pilot channel estimate and a normal boosting factor associated with the FCH pilot subcarriers to form equalized FCH pilot subcarriers; dividing the extracted FCH data subcarriers by the extracted corresponding data channel estimate to form equalized FCH data subcarriers; determining a normalization factor corresponding to zone boosting based on the equalized FCH pilot subcarriers and the equalized FCH data subcarriers; normalizing the equalized FCH data subcarriers by dividing the equalized FCH data subcarriers with the normalization factor; and determining the FCH based on the normalized FCH data subcarriers.

Certain embodiments of the present disclosure provide a receiver for wireless communication. The receiver generally includes initial channel estimation logic configured to determine an initial CE based on a preamble of a signal received by the receiver via a wireless channel; interpolation logic configured to generate an interpolated CE based on the initial CE by estimating frequency responses of the channel for other subcarriers not included in the initial CE; subcarrier extraction logic configured to extract pilot and data subcarriers from an FCH of the signal; channel estimation extraction logic configured to extract, from the interpolated CE, channel estimates corresponding to the extracted FCH pilot and data subcarriers; first division logic configured to divide the extracted FCH pilot subcarriers by the extracted corresponding pilot channel estimate and a normal boosting factor associated with the FCH pilot subcarriers to form equalized FCH pilot subcarriers; second division logic configured to divide the extracted FCH data subcarriers by the extracted corresponding data channel estimate to form equalized FCH data subcarriers; normalization factor determination logic configured to determine a normalization factor corresponding to zone boosting based on the equalized FCH pilot subcarriers and the equalized FCH data subcarriers; third division logic configured to normalize the equalized FCH data subcarriers by dividing the equalized FCH data subcarriers with the normalization factor; and interpretation logic configured to determine the FCH based on the normalized FCH data subcarriers.

Certain embodiments of the present disclosure provide an apparatus for wireless communication. The apparatus generally includes means for determining an initial CE based on a preamble of a signal received via a wireless channel; means for generating an interpolated CE based on the initial CE by estimating frequency responses of the channel for other subcarriers not included in the initial CE; means for extracting pilot and data subcarriers from an FCH of the signal; means for extracting, from the interpolated CE, channel estimates corresponding to the extracted FCH pilot and data subcarriers; means for dividing the extracted FCH pilot subcarriers by the extracted corresponding pilot channel estimate and a normal boosting factor associated with the FCH pilot subcarriers to form equalized FCH pilot subcarriers; means for dividing the extracted FCH data subcarriers by the extracted corresponding data channel estimate to form equalized FCH data subcarriers; means for determining a normalization factor corresponding to zone boosting based on the equalized FCH pilot subcarriers and the equalized FCH data subcarriers; means for normalizing the equalized FCH data subcarriers by dividing the equalized FCH data subcarriers with the normalization factor; and means for determining the FCH based on the normalized FCH data sub carriers.

Certain embodiments of the present disclosure provide a mobile device. The mobile device generally includes a receiver front end for receiving a signal transmitted via a wireless channel; initial channel estimation logic configured to determine an initial CE based on a preamble of the received signal; interpolation logic configured to generate an interpolated CE based on the initial CE by estimating frequency responses of the channel for other subcarriers not included in the initial CE; subcarrier extraction logic configured to extract pilot and data subcarriers from an FCH of the signal; CE extraction logic configured to extract, from the interpolated CE, channel estimates corresponding to the extracted FCH pilot and data subcarriers; first division logic configured to divide the extracted FCH pilot subcarriers by the extracted corresponding pilot channel estimate and a normal boosting factor associated with the FCH pilot subcarriers to form equalized FCH pilot subcarriers; second division logic configured to divide the extracted FCH data subcarriers by the extracted corresponding data channel estimate to form equalized FCH data subcarriers; normalization factor determination logic configured to determine a normalization factor corresponding to zone boosting based on the equalized FCH pilot subcarriers and the equalized FCH data subcarriers; third division logic configured to normalize the equalized FCH data subcarriers by dividing the equalized FCH data subcarriers with the normalization factor; and interpretation logic configured to determine the FCH based on the normalized FCH data sub carriers.

Certain embodiments of the present disclosure provide a computer-readable medium containing a program for initially decoding an FCH, which, when executed by a processor, performs certain operations. The operations generally include determining an initial CE based on a preamble of a signal received via a wireless channel; generating an interpolated CE based on the initial CE by estimating frequency responses of the channel for other subcarriers not included in the initial CE; extracting pilot and data subcarriers from the FCH of the signal; from the interpolated CE, extracting channel estimates corresponding to the extracted FCH pilot and data subcarriers; dividing the extracted FCH pilot subcarriers by the extracted corresponding pilot channel estimate and a normal boosting factor associated with the FCH pilot subcarriers to form equalized FCH pilot subcarriers; dividing the extracted FCH data subcarriers by the extracted corresponding data channel estimate to form equalized FCH data subcarriers; determining a normalization factor corresponding to zone boosting based on the equalized FCH pilot subcarriers and the equalized FCH data subcarriers; normalizing the equalized FCH data subcarriers by dividing the equalized FCH data subcarriers with the normalization factor; and determining the FCH based on the normalized FCH data sub carriers.

Certain embodiments of the present disclosure provide a method. The method generally includes extracting pilot and data subcarriers from an FCH of a signal received via a wireless channel; determining an initial CE based on the extracted FCH pilot subcarriers; generating an interpolated CE based on the initial CE by estimating frequency responses of the channel for the extracted FCH data subcarriers; from the interpolated CE, extracting a channel estimate corresponding to the FCH data subcarriers; dividing the extracted FCH data subcarriers by the extracted channel estimate to form equalized FCH data subcarriers; and determining the FCH based on the equalized FCH data subcarriers.

Certain embodiments of the present disclosure provide a computer-readable medium containing a program for initially decoding an FCH, which, when executed by a processor, performs certain operations. The operation generally include extracting pilot and data subcarriers from the FCH of a signal received via a wireless channel; determining an initial CE based on the extracted FCH pilot subcarriers; generating an interpolated CE based on the initial CE by estimating frequency responses of the channel for the extracted FCH data subcarriers; from the interpolated CE, extracting a channel estimate corresponding to the FCH data subcarriers; dividing the extracted FCH data subcarriers by the extracted channel estimate to form equalized FCH data subcarriers; and determining the FCH based on the equalized FCH data subcarriers.

Certain embodiments of the present disclosure provide an apparatus for wireless communication. The apparatus generally includes means for extracting pilot and data subcarriers from an FCH of a signal received via a wireless channel; means for determining an initial CE based on the extracted FCH pilot subcarriers; means for generating an interpolated CE based on the initial CE by estimating frequency responses of the channel for the extracted FCH data subcarriers; means for extracting, from the interpolated CE, a channel estimate corresponding to the FCH data subcarriers; means for dividing the extracted FCH data subcarriers by the extracted channel estimate to form equalized FCH data subcarriers; and means for determining the FCH based on the equalized FCH data subcarriers.

Certain embodiments of the present disclosure provide a receiver for wireless communication. The receiver generally includes subcarrier extraction logic configured to extract pilot and data subcarriers from an FCH of a signal received via a wireless channel; initial channel estimation logic configured to determine an initial CE based on the extracted FCH pilot subcarriers; interpolation logic configured to generate an interpolated CE based on the initial CE by estimating frequency responses of the channel for the extracted FCH data subcarriers; CE extraction logic configured to extract, from the interpolated CE, a channel estimate corresponding to the FCH data subcarriers; division logic configured to divide the extracted FCH data subcarriers by the extracted channel estimate to form equalized FCH data subcarriers; and interpretation logic configured to determine the FCH based on the equalized FCH data sub carriers.

Certain embodiments of the present disclosure provide a mobile device. The mobile device generally includes a receiver front end for receiving a signal transmitted via a wireless channel; subcarrier extraction logic configured to extract pilot and data subcarriers from an FCH of the received signal; initial channel estimation logic configured to determine an initial CE based on the extracted FCH pilot subcarriers; interpolation logic configured to generate an interpolated CE based on the initial CE by estimating frequency responses of the channel for the extracted FCH data subcarriers; CE extraction logic configured to extract, from the interpolated CE, a channel estimate corresponding to the FCH data subcarriers; division logic configured to divide the extracted FCH data subcarriers by the extracted channel estimate to form equalized FCH data subcarriers; and interpretation logic configured to determine the FCH based on the equalized FCH data subcarriers.

Certain embodiments of the present disclosure provide a method. The method generally includes determining a first initial CE based on a preamble of a signal received via a wireless channel; generating a first interpolated CE by estimating frequency responses of the channel for subcarriers not included in the first initial CE; extracting pilot and data subcarriers from an FCH of the signal; from the first interpolated CE, extracting a channel estimate corresponding to the FCH pilot subcarriers; determining a second initial CE based on the extracted FCH pilot subcarriers; estimating a zone boosting factor for the signal; normalizing the second initial CE by the estimated zone boosting factor; generating a second interpolated CE based on the extracted corresponding pilot channel estimate and the normalized second initial CE by estimating frequency responses of the channel for subcarriers not included in the pilot channel estimate or the normalized second initial CE; from the second interpolated CE, extracting a channel estimate corresponding to the extracted FCH data subcarriers; dividing the extracted FCH data subcarriers by the extracted corresponding data channel estimate and the estimated zone boosting factor to form equalized FCH data subcarriers; and determining the FCH based on the equalized FCH data subcarriers.

Certain embodiments of the present disclosure provide a computer-readable medium containing a program for initially decoding an FCH, which, when executed by a processor, performs certain operations. The operations generally include determining a first initial CE based on a preamble of a signal received via a wireless channel; generating a first interpolated CE by estimating frequency responses of the channel for subcarriers not included in the first initial CE; extracting pilot and data subcarriers from the FCH of the signal; from the first interpolated CE, extracting a channel estimate corresponding to the FCH pilot subcarriers; determining a second initial CE based on the extracted FCH pilot subcarriers; estimating a zone boosting factor for the signal; normalizing the second initial CE by the estimated zone boosting factor; generating a second interpolated CE based on the extracted corresponding pilot channel estimate and the normalized second initial CE by estimating frequency responses of the channel for subcarriers not included in the pilot channel estimate or the normalized second initial CE; from the second interpolated CE, extracting a channel estimate corresponding to the extracted FCH data subcarriers; dividing the extracted FCH data subcarriers by the extracted corresponding data channel estimate and the estimated zone boosting factor to form equalized FCH data subcarriers; and determining the FCH based on the equalized FCH data subcarriers.

Certain embodiments of the present disclosure provide an apparatus for wireless communication. The apparatus generally includes means for determining a first initial CE based on a preamble of a signal received via a wireless channel; means for generating a first interpolated CE by estimating frequency responses of the channel for subcarriers not included in the first initial CE; means for extracting pilot and data subcarriers from an FCH of the signal; means for extracting, from the first interpolated CE, a channel estimate corresponding to the FCH pilot subcarriers; means for determining a second initial CE based on the extracted FCH pilot subcarriers; means for estimating a zone boosting factor for the signal; normalizing the second initial CE by the estimated zone boosting factor; means for generating a second interpolated CE based on the extracted corresponding pilot channel estimate and the normalized second initial CE by estimating frequency responses of the channel for subcarriers not included in the pilot channel estimate or the normalized second initial CE; means for extracting, from the second interpolated CE, a channel estimate corresponding to the extracted FCH data subcarriers; means for dividing the extracted FCH data subcarriers by the extracted corresponding data channel estimate and the estimated zone boosting factor to form equalized FCH data subcarriers; and means for determining the FCH based on the equalized FCH data subcarriers.

Certain embodiments of the present disclosure provide a receiver for wireless communication. The receiver generally includes first initial channel estimation logic configured to determine a first initial CE based on a preamble of a signal received via a wireless channel; first interpolation logic configured to generate a first interpolated CE by estimating frequency responses of the channel for subcarriers not included in the first initial CE; subcarrier extraction logic configured to extract pilot and data subcarriers from an FCH of the signal; first CE extraction logic configured to extract, from the first interpolated CE, a channel estimate corresponding to the FCH pilot subcarriers; second initial channel estimation logic configured to determine a second initial CE based on the extracted FCH pilot subcarriers; zone boosting factor estimation logic configured to estimate a zone boosting factor for the signal; normalization logic configured to normalize the second initial CE by the estimated zone boosting factor; second interpolation logic configured to generate a second interpolated CE based on the extracted corresponding pilot channel estimate and the normalized second initial CE by estimating frequency responses of the channel for subcarriers not included in the pilot channel estimate or the normalized second initial CE; second CE extraction logic configured to extract, from the second interpolated CE, a channel estimate corresponding to the extracted FCH data subcarriers; division logic configured to divide the extracted FCH data subcarriers by the extracted corresponding data channel estimate and the estimated zone boosting factor to form equalized FCH data subcarriers; and interpretation logic configured to determine the FCH based on the equalized FCH data sub carriers.

Certain embodiments of the present disclosure provide a mobile device. The mobile device generally includes a receiver front end for receiving a signal transmitted via a wireless channel; first initial channel estimation logic configured to determine a first initial CE based on a preamble of the received signal; first interpolation logic configured to generate a first interpolated CE by estimating frequency responses of the channel for subcarriers not included in the first initial CE; subcarrier extraction logic configured to extract pilot and data subcarriers from an FCH of the signal; first CE extraction logic configured to extract, from the first interpolated CE, a channel estimate corresponding to the FCH pilot subcarriers; second initial channel estimation logic configured to determine a second initial CE based on the extracted FCH pilot subcarriers; zone boosting factor estimation logic configured to estimate a zone boosting factor for the signal; normalization logic configured to normalize the second initial CE by the estimated zone boosting factor; second interpolation logic configured to generate a second interpolated CE based on the extracted corresponding pilot channel estimate and the normalized second initial CE by estimating frequency responses of the channel for subcarriers not included in the pilot channel estimate or the normalized second initial CE; second CE extraction logic configured to extract, from the second interpolated CE, a channel estimate corresponding to the extracted FCH data subcarriers; division logic configured to divide the extracted FCH data subcarriers by the extracted corresponding data channel estimate and the estimated zone boosting factor to form equalized FCH data subcarriers; and interpretation logic configured to determine the FCH based on the equalized FCH data subcarriers.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/A frame for Time Division Duplex (TDD) and the format of the Frame Control Header (FCH) contained therein, the FCH including downlink Frame Prefix (DLFP) information, in accordance with certain embodiments of the present disclosure.

DETAILED DESCRIPTION

Figure 1:
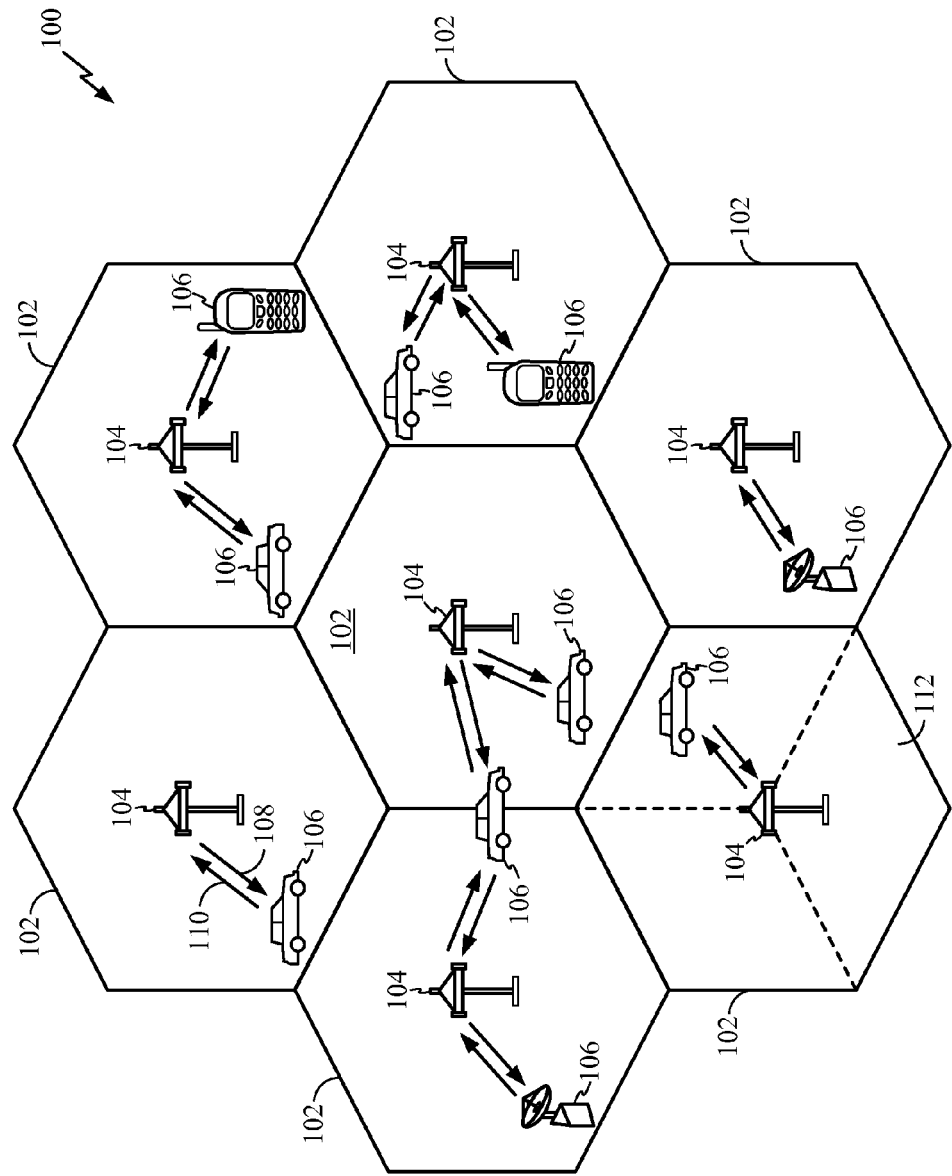
FIG. 1 illustrates an example wireless communication system, in accordance with certain embodiments of the present disclosure.

Certain embodiments of the present disclosure provide techniques and apparatus for initially decoding a frame control header (FCH) in an orthogonal frequency-division multiplexing (OFDM) or orthogonal frequency division multiple access (OFDMA) system in an effort to accurately determine the downlink frame prefix (DLFP) such that the remainder of an OFDM/A frame may be properly decoded. Used, for example, when boosting factors applied in the transmitter to various elements of the OFDM/A frame and/or available pilots for the FCH are unknown, these techniques may utilize a preamble channel estimate, the FCH pilots, or a combination thereof Exemplary Wireless Communication System The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. Those standards at least define four different physical layers (PHYs) and one media access control (MAC) layer. The OFDM and OFDMA physical layer of the four physical layers are generally considered the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
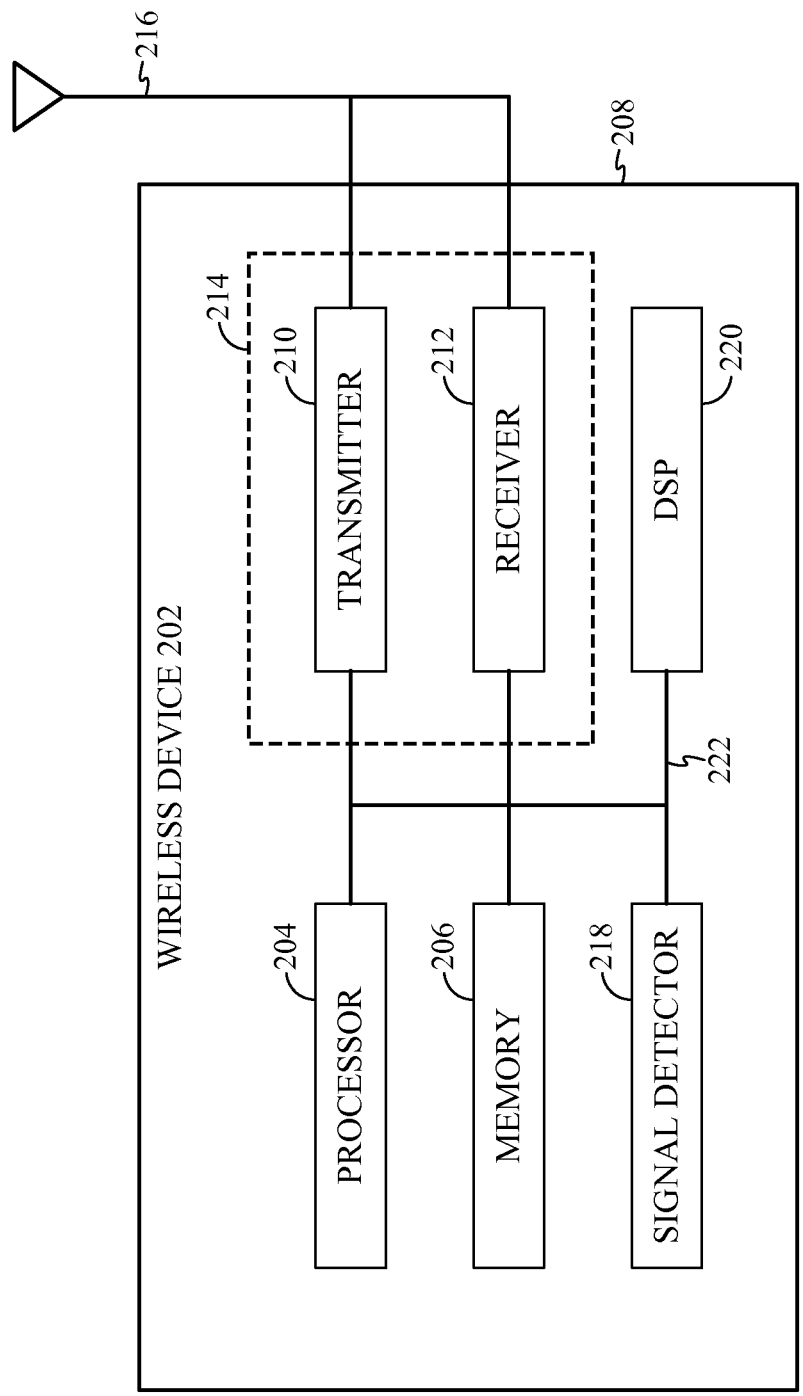
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
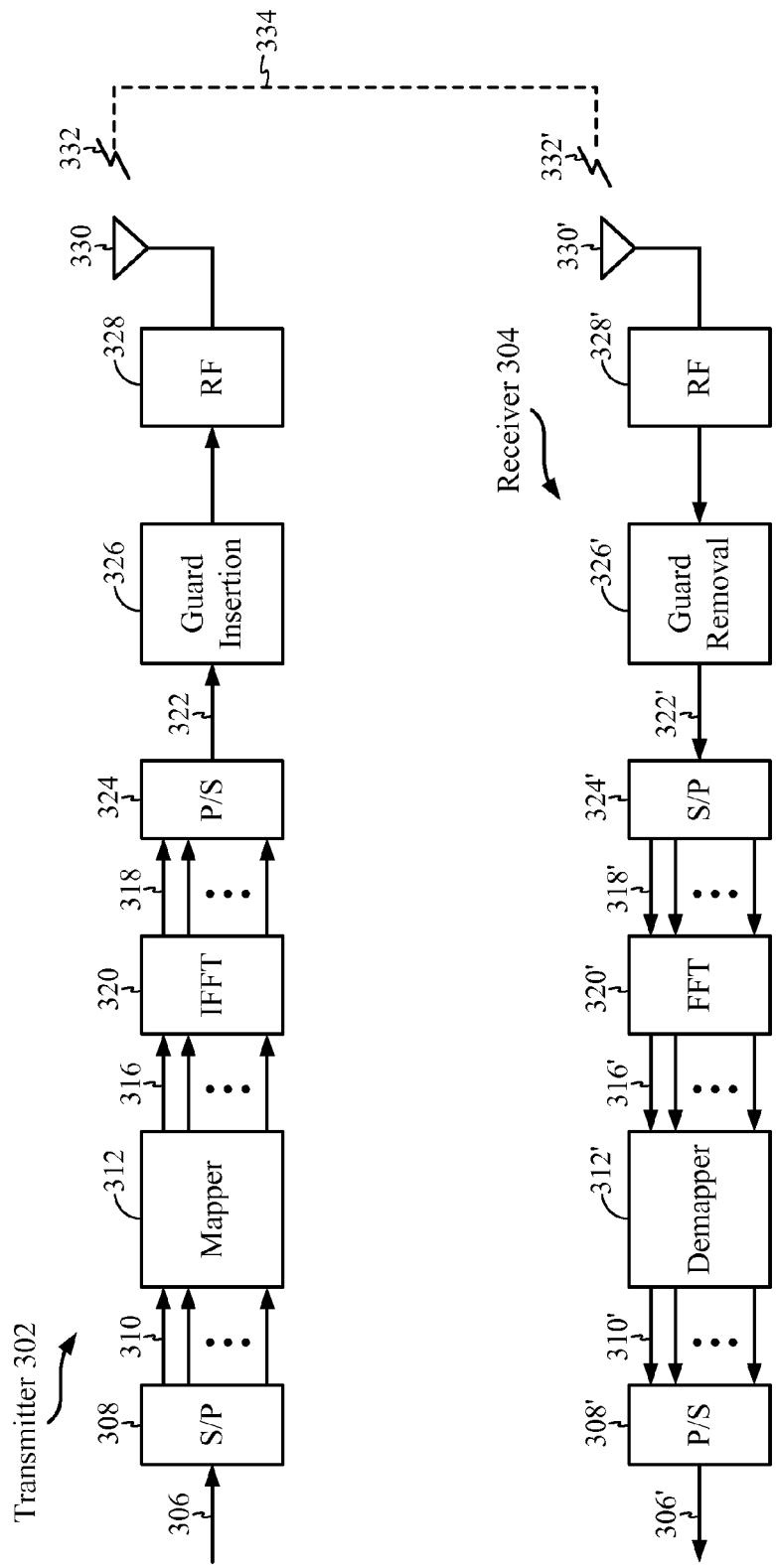
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/A Frame

Figure 4A:
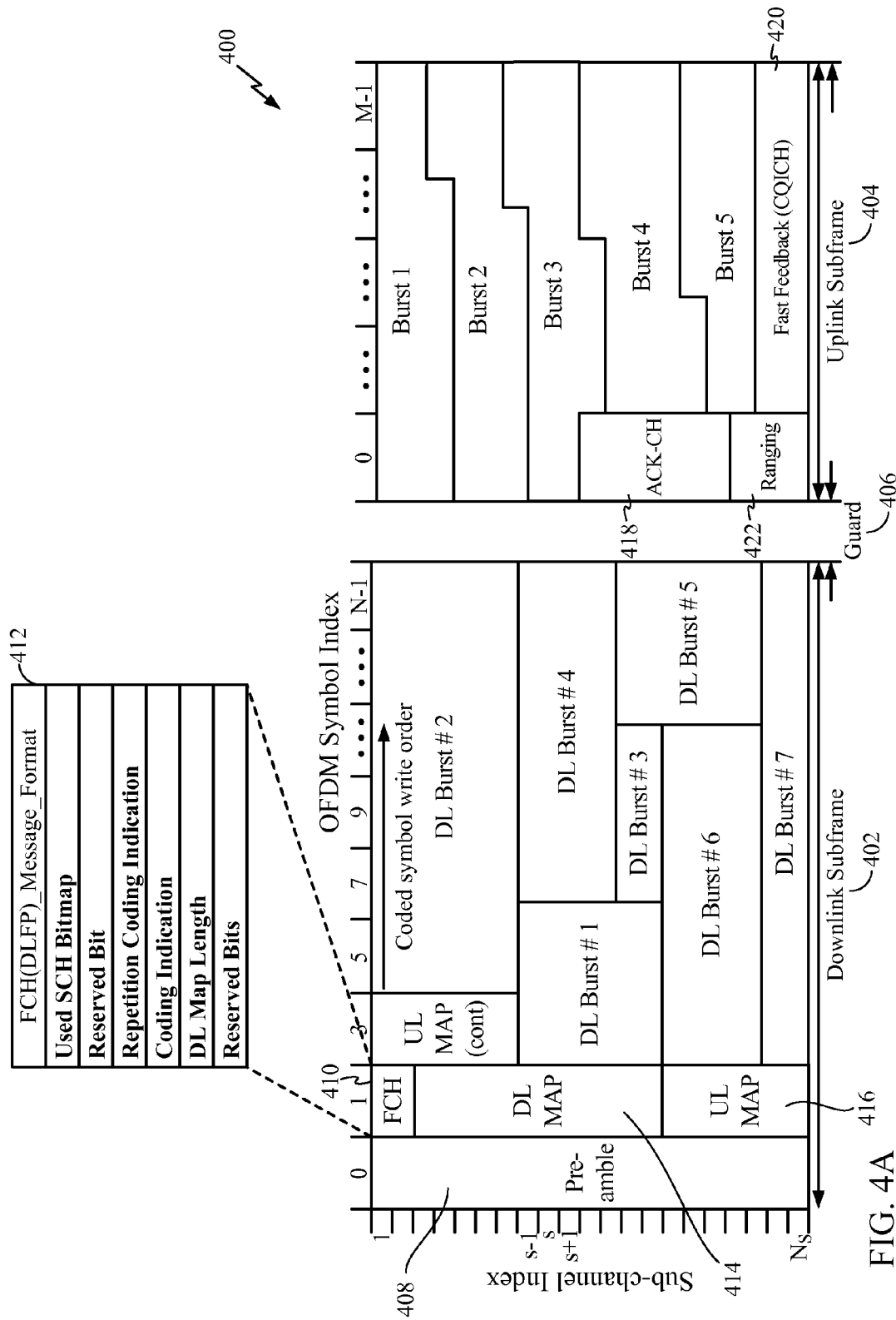

Referring now to FIG. 4A, an OFDM/A frame 400 for a Time Division Duplex (TDD) implementation is depicted as a typical, but not limiting, example. Other implementations of an OFDM/A frame, such as Full and Half-Duplex Frequency Division Duplex (FDD) may be used, in which case the frame is the same except that both downlink (DL) and uplink (UL) are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/A frame 400, various control information may be included. For example, the first OFDM/A symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 3 is to be used.

A Frame Control Header (FCH) 410 may follow the preamble 408. The FCH 410 may provide frame configuration information, such as the usable subchannels, the modulation and coding scheme, and the Media Access Protocol (MAP) message length for the current OFDM/A frame. A data structure, such as the downlink Frame Prefix (DLFP) 412, outlining the frame configuration information may be mapped to the FCH 410. For Mobile WiMAX, the DLFP 412 may comprise six bits for the used subchannel (SCH) bitmap 412a, a reserved bit 412b set to 0, two bits for the repetition coding indication 412c, three bits for the coding indication 412d, eight bits for the Media Access Protocol (MAP) message length 412e, and four reserved bits 412f set to 0 for a total of 24 bits in the DLFP 412 as illustrated in FIG. 4B. Before being mapped to the FCH 410, the 24-bit DLFP may be duplicated to form a 48-bit block, which is the minimal forward error correction (FEC) block size.

Following the FCH 410, a DL MAP 414 and a UL MAP 416 may specify subchannel allocation and other control information for the DL and UL subframes 402, 404. In the case of OFDMA, multiple users may be allocated data regions within the frame, and these allocations may be specified in the DL and UL MAP messages 414, 416. The MAP messages may include the burst profile for each user, which defines the modulation and coding scheme used in a particular link. The DL subframe 402 of the OFDM/A frame may include DL bursts of various bit lengths containing the downlink data being communicated. Thus, the DL MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests.

Altogether, the preamble 408, the FCH 410, the DL MAP 414, and the UL MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and does not use all the subchannels available to it (i.e., a DL-PUSC zone only uses particular groups of subchannels). There may be a total of six subchannel groups, which can be assigned to up to three segments. Thus, a segment can contain one to six subchannels (e.g., segment 0 contains three subchannel groups, segment 1 contains two, and segment 2 contains one subchannel group). Another type of zone is called DL-FUSC (downlink full usage of subchannels). Unlike DL-PUSC, DL-FUSC does not use any segments, but can distribute all bursts over the complete frequency range.

Exemplary OFDM/A Transmission and Reception

Figure 5:
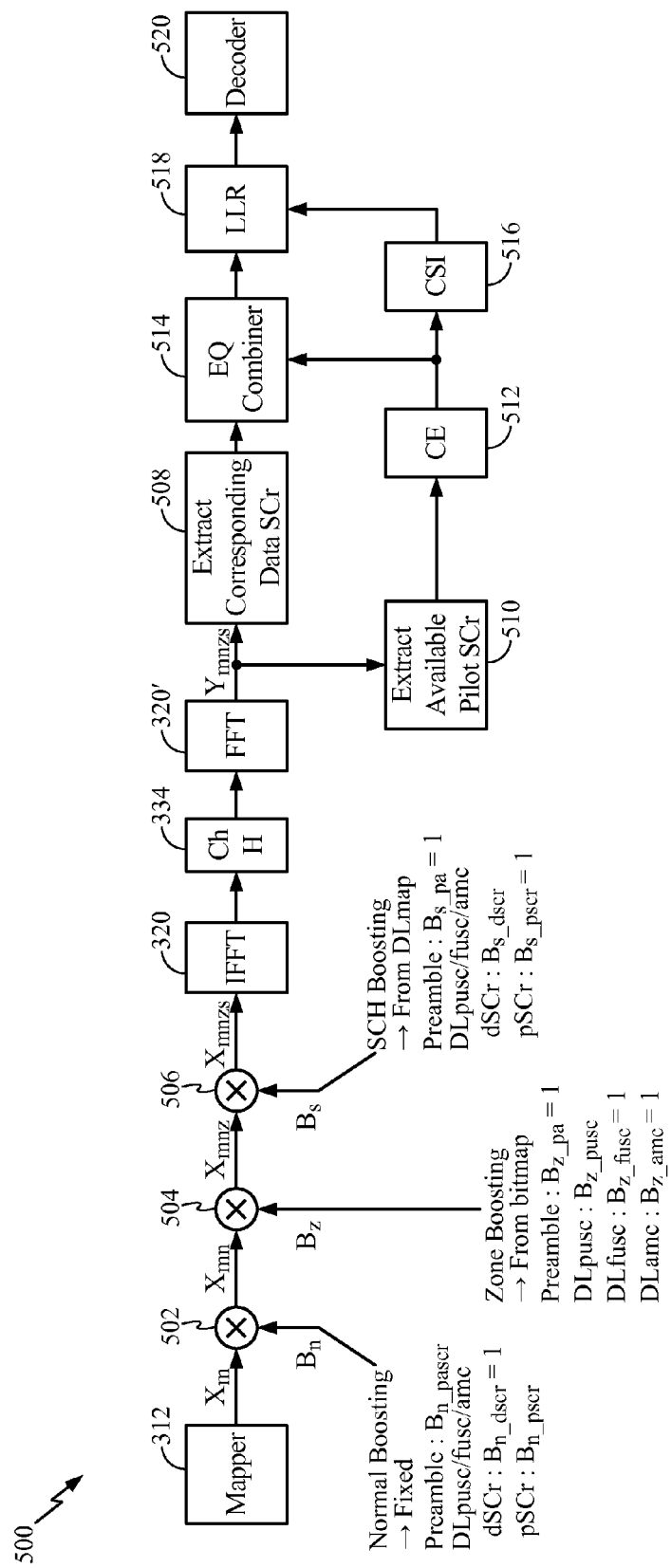
FIG. 5 illustrates transmission and reception across a wireless channel with normal, zone, and subchannel boosting, in accordance with certain embodiments of the present disclosure.

Before an OFDM/A frame, such as the example OFDM/A frame 400 of FIG. 4A, is transmitted by the transmitter 302, various subcarriers of the processed and mapped OFDM/A frame exiting the mapper 312 may be boosted in the frequency domain according to corresponding boosting factors as illustrated in FIG. 5. Since all constellations (e.g., BPSK, QPSK, 16QAM, and 64QAM) in the diagram are normalized to achieve equal average power, the subcarriers may be boosted with different boosting factors according to their subcarrier index k. A normal boosting factor ($B_n$) may be applied to differentiate between subcarriers in the preamble, pilot subcarriers, and data subcarriers. Conceptually, the mapped signal ($X_m$) exiting the mapper 312 may be multiplied with $B_n$ in a first multiplier 502 to produce a mapped and normal boosted signal ($X_{mn}$). For data subcarriers, the normal boosting factor is typically equal to 1 ($B_{n\_dscr}=1$), indicating that data subcarriers may not normally be boosted. Unlike the data subcarriers, the preamble and the pilot subcarriers may have normal boosting factors greater than 1 ($B_{n\_pascr}$, $B_{n\_pscr}$>1). For example, the power of the subcarriers in the downlink preamble may be boosted by about 9 dB, and the power of the pilot subcarriers may be boosted by approximately 2.5 dB when compared to the power of the data subcarriers. The normal boosting factor may be fixed.

When not all subchannels are used within the first DL-PUSC zone, zone boosting may be applied, thereby boosting the pilot and data subcarriers in the corresponding zone. The subcarrier power of the zone may be increased as follows:

$$10 \log(N_{useful}/N_{allowed})$$

where Nuseful is the number of all useful subcarriers (of all the subchannels) depending on the permutation scheme and excluding the DC subcarrier, and Nallowed is the number of subcarriers of the selected subchannels (that are allowed to be used in the zone). Conceptually, the mapped and normal boosted signal (Xmn) may be multiplied with a zone boosting factor (Bz) in a second multiplier 504 to generate a mapped, normal boosted, and zone boosted signal (Xmnz) as illustrated in FIG. 5. For pilot and data subcarriers in the DL-PUSC, the zone boosting factor may be greater than 1 ($B_{z\_pusc}$>1), whereas the zone boosting factor for the preamble and the other downlink zones may be equal to 1 ($B_{z\_pa}=B_{z\_fusc}=B_{z\_amc}=1$). The zone boosting factor (Bz) may be written to (and later extracted from) the used subchannel bitmap 412a in the DLFP, which is mapped to the FCH 410.

For some embodiments, data subcarriers within certain subchannels may have a subchannel (SCH) boosting factor ($B_s$) applied according to the DL MAP 414. Conceptually, the mapped, normal boosted, and zone boosted signal ($X_{mnz}$) may be multiplied with the SCH boosting factor ($B_s$) in a third multiplier 506 to generate a mapped, normal boosted, zone boosted, and SCH boosted signal ($X_{mnzs}$) as illustrated in FIG. 5. For such data subcarriers, the SCH boosting factor may be greater than 1 ($B_{s\_dscr}$>1), whereas the SCH boosting factor for the preamble and the pilot subcarriers may be equal to 1 ($B_{s\_pa}=B_{s\_pscr}=1$).

Once the boosting factors have been applied to the various subcarriers in the frequency domain, the resulting signal $X_{mnzs}$ may be converted to the time domain by the IFFT component 320 as described above. The transmitter 302 may transmit the time domain signal across a wireless channel h 334 having a transfer function H to be received by the receiver 304.

The FFT component 320' of the receiver 304 may convert the received signal into the frequency domain to be processed and decoded in later stages, the result of the FFT being the signal $Y_{mnzs}=HX_{mnzs}$. Therefore, for the preamble signal in the frequency domain, the transmitted preamble ($X_{pa}$) and the received preamble ($Y_{pa}$) may be expressed as follows:

$$X_{pa}=X_{mnzs}=X_m B_{n\_pascr}$$

$$Y_{pa}=Y_{mnzs}=HX_{mnzs}=HX_m B_{n\_pascr}$$

since there is no zone boosting or SCH boosting for the preamble (i.e., $B_{z\_pa}=B_{s\_pa}=1$). For pilot signals of the FCH (containing the DLFP) in the frequency domain, the transmitted FCH/DLFP pilots ($X_{fchp}$) and the received FCH/DLFP pilots ($Y_{fchp}$) may be expressed as follows:

$$X_{fchp}=X_{mnzs}=X_m B_{n\_pscr} B_z$$

$$Y_{fchp}=Y_{mnzs}=HX_{mnzs}=HX_m B_{n\_pscr} B_z$$

since there is no SCH boosting for the FCH pilots (i.e., $B_{s\_pscr}=1$). For FCH/DLFP data signals in the frequency domain, the transmitted FCH/DLFP data ($X_{fchd}$) and the received FCH/DLFP data ($Y_{fchd}$) may be expressed as follows:

$$X_{fchd}=X_{mnzs}=X_m B_z$$

$$Y_{fchd}=Y_{mnzs}=HX_{mnzs}=HX_m B_z$$

since there is no normal boosting or SCH boosting for the FCH data (i.e., $B_{n\_dscr}=B_{s\_dscr}=1$).

The $Y_{mnzs}$ signal output from the FFT component 320' may be sent to data subcarrier extraction logic 508, the data subcarriers corresponding to the available pilot subcarriers. The output of the FFT component 320' may also be sent to available pilot subcarrier extraction logic 510, and channel estimation (CE) logic 512 may estimate the channel based on the extracted pilot subcarriers. The output of the CE logic 512 may be a Fourier transform of the channel h. Equalization (EQ) of the data subcarriers based on the estimated channel from the CE logic 512 may be performed in the EQ combiner 514, and channel state information (CSI), also based on the estimated channel, may be arranged in the CSI block 516.

In a log likelihood ratio (LLR) block 518, the outputs of the EQ combiner 514 and the CSI block 516 may be processed to form an output weighted signal according to LLR calculations, for example. For some embodiments, the processing may include multiplying a demodulated received signal and the corresponding CSI signal from the CSI block 516. The output weighted signal may be sent from the LLR block 518 to the channel decoder 520, which may decode the demapped bits and output an interpreted message.

Exemplary Overall Decoding Scheme

Figure 6:
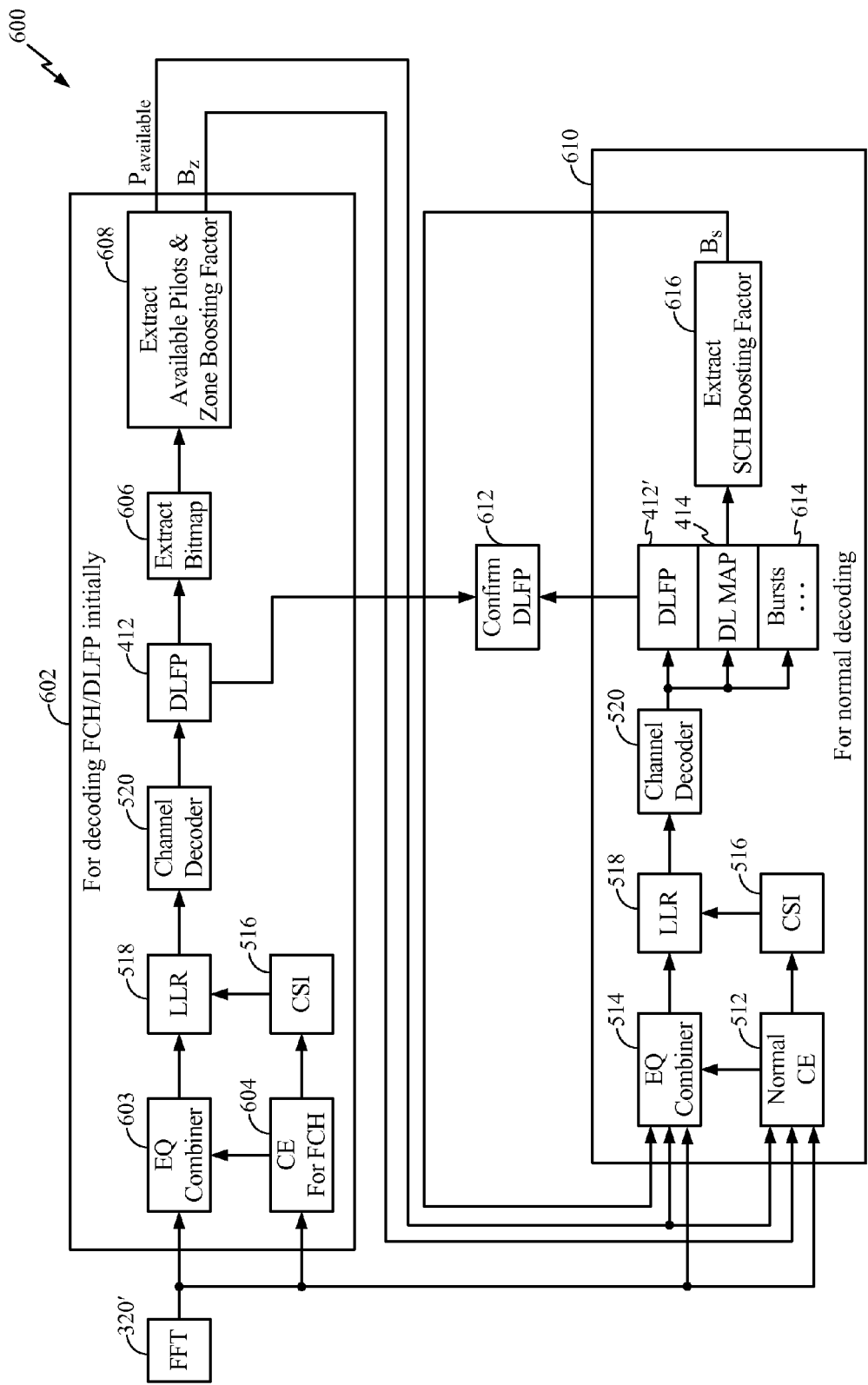
FIG. 6 is a conceptual block diagram of initial FCH/DLFP decoding followed by normal decoding, in accordance with certain embodiments of the present disclosure.

Referring now to FIG. 6, a conceptual block diagram 600 of initial FCH/DLFP decoding followed by normal decoding is illustrated. In practice, many of the blocks contained therein may be combined with the processes occurring in parallel, but the block diagram 600 of FIG. 6 depicts a possible processing sequence when receiving a transmitted OFDM/A frame to understand the complexities of properly decoding the FCH 410.

As described above, the received signal may be processed in the FFT component 320' such that the signal is converted into the frequency domain for processing of the subcarriers. The $Y_{mnzs}$ signal output from the FFT component 320' may enter an FCH decoder 602 in an effort to extract the DLFP from the FCH 410 to discern the used SCH bitmap, extract the available pilots and the zone boosting factor ($B_z$), and be able to read the DL MAP 414. For initial FCH/DLFP decoding, the problem is that the used SCH bitmap 412a, the zone boosting factor, and the available pilots may most likely be unknown, especially in the case of a cold start where OFDM/A frames have not already been transmitted. Therefore, it is difficult to apply a normal CE/EQ scheme at this stage. If OFDM/A frames have already been transmitted, then the used SCH bitmap 412a may be extracted using the FCH/DLFP decoded in a previous frame. However, the subchannel bitmaps may change from frame to frame, so there is no guarantee that the used SCH bitmap from a previous frame will apply to the current frame. To circumvent this problem in the FCH decoder 602, the $Y_{mnzs}$ signal may be sent to a special EQ combiner 603 and special channel estimation (CE) logic 604 for FCH decoding.

The outputs of the EQ combiner 603 and the CE logic 604 for FCH decoding may be sent to the LLR block 518 and the CSI block 516, such that the output of the LLR block 518 may be decoded by the channel decoder 520 as described above.

Once, the FCH 410 has been decoded, the DLFP 412 mapped to the FCH can be interpreted. For example, the used SCH bitmap 412a may be extracted in bitmap extraction logic 606, from which the available pilots ($P_{available}$) and the zone boosting factor ($B_e$) may be determined in the $P_{available}$ and $B_z$ extraction logic 608.

In the normal decoder 610, normal channel estimation and equalization may be performed on the output of the FFT component 320' as described above, using the extracted $P_{available}$ and $B_z$. Channel estimation may be performed based on an initial CE with a two-dimensional (2-D) time-frequency interpolation scheme that utilizes CE of the preamble and all available pilots of multiple symbols including all the FCH pilots. For some embodiments, the FCH 410 may be decoded again for more accurate FCH decoding after the available pilots and the zone boosting factor have been extracted, and the new DLFP 412' may be compared to the initially decoded and interpreted DLFP 412 in DLFP confirmation logic 612. However, the process of comparing the initially interpreted DLFP 412 and the new DLFP 412' may be omitted if the initial FCH decoding scheme is sufficiently reliable.

After the signal has been decoded in the channel decoder 520 as described above, the DL MAP 414 may be extracted now that the coding indication 412d and the MAP message length 412e have been interpreted from the DLFP. SCH boosting factor extraction logic 616 may be used to extract $B_s$ for each data burst from the DL MAP 414. The SCH boosting factor may be used by the EQ combiner 514 in an effort to decode the data bursts but need not be used by the CE logic 512 since there is most likely no SCH boosting for the pilot subcarriers in the data bursts 614 ($B_{s\_pscr}=1$). Furthermore, SCH boosting is not typically applied to the FCH 410 or the DL MAP 414, so the EQ combiner 514 need not know $B_s$ in order to decode these messages.

Exemplary Initial FCH Decoding using the Preamble

Figure 7:
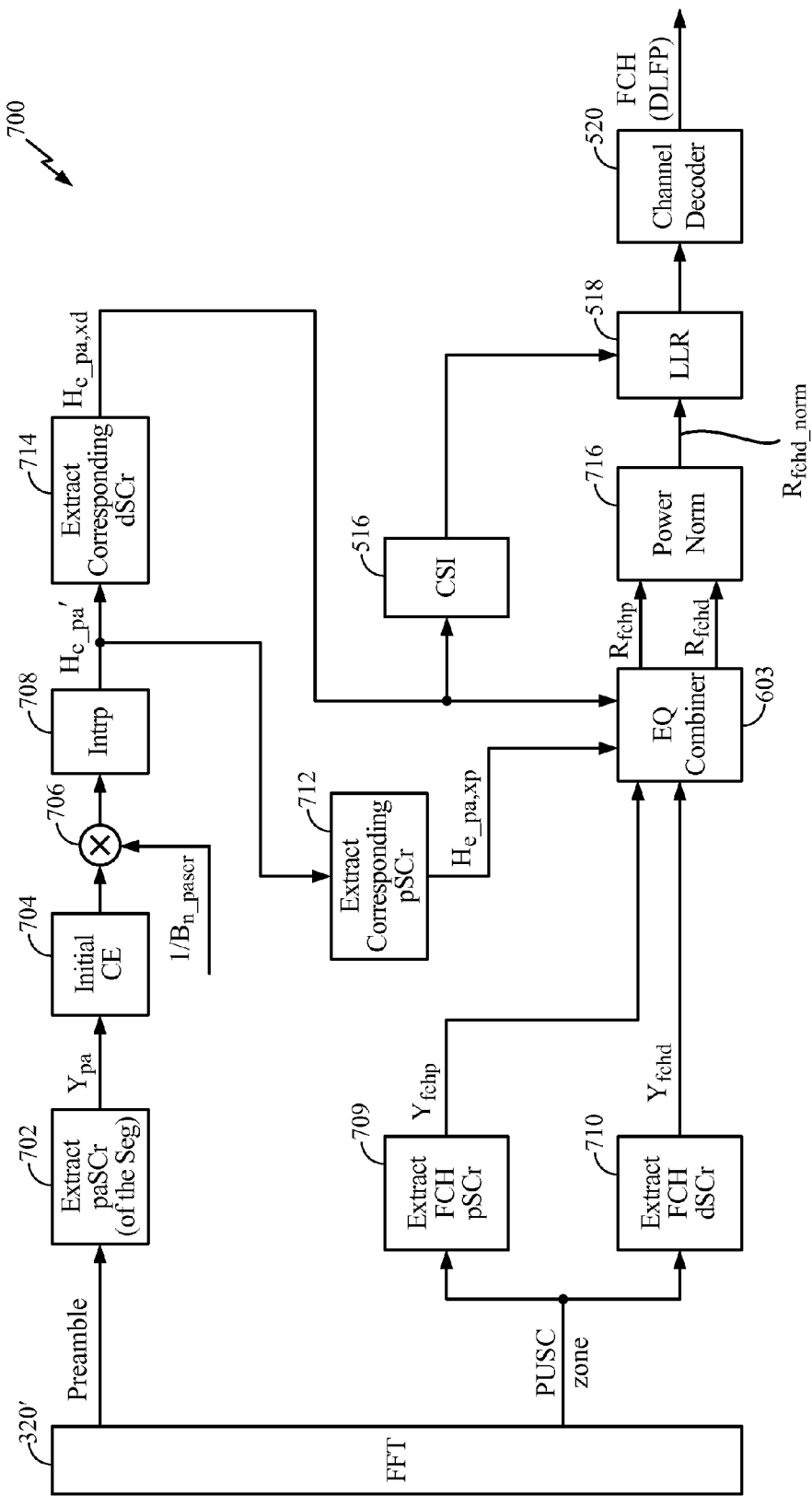
FIG. 7 illustrates initial FCH/DLFP decoding based on channel estimation (CE) using the preamble of an OFDM/A frame, in accordance with certain embodiments of the present disclosure.

FIG. 7 illustrates a block diagram 700 for one method of initial FCH/DLFP decoding based on initial channel estimation (CE) using the preamble 408 of an OFDM/A frame directly. Assuming that the wireless channel h is static for three OFDM symbols, this initial FCH/DLFP method need not know the used SCH bitmap 412a or the zone boosting factor ($B_z$) for decoding the FCH 410.

The preamble subcarriers ($Y_{pa}$) may be extracted from the output of the FFT component 320' by paSCr extraction logic 702. The initial CE logic 704 may perform a channel estimation by dividing the preamble subcarriers ($Y_{pa}$) by the known preamble ($X_m=X_{pa}$), for example, and a multiplier 706 may be used to effectively divide the result by the known normal boosting factor for the preamble ($B_{n\_pascr}$) in an effort to remove any boosting factors from the preamble, according to the following:

$$H_{e\_pa} = \frac{Y_{pa}(=HX_mB_{n\_pascr})}{X_m} \times \frac{1}{B_{n\_pascr}} = H$$

where $H_{e\_pa}$ is the initial estimate of the channel h based on the preamble. Although multipliers are described with respect to FIGS. 7-9, those skilled in the art may understand that any suitable logic for performing the equivalent calculation (e.g., dividing by a value versus multiplying by the multiplicative inverse of the value) may be used.

An interpolator 708 may perform frequency interpolation of the initial channel estimate $H_{e\_pa}$ such that $H_{e\_pa}'$ is the interpolated channel estimate. In general for channel estimation, frequency interpolation, which is based on the initial channel estimate, may be used to estimate the frequency response of the subcarriers at frequencies between those of the pilot subcarriers. For frequency interpolation, any suitable interpolation technique, such as linear interpolation, may be used.

From the DL-PUSC zone at the output of the FFT component 320', FCH pilot subcarriers ($Y_{fchp}$) may be extracted by FCH pSCr extraction logic 709, and FCH data subcarriers ($Y_{fchd}$) may be extracted by FCH dSCr extraction logic 710. Channel estimates ($H_{e\_pa,xp}$) corresponding to the FCH pilot subcarriers (i.e., frequency responses of the channel h at the same frequencies as the FCH pilot subcarriers) may be extracted from the interpolated channel estimate ($H_{e\_pa}'$) by corresponding pilot subcarrier extraction logic 712. Likewise, channel estimates ($H_{e\_pa,xd}$) corresponding to the FCH data subcarriers (i.e., frequency responses of the channel h at the same frequencies as the FCH data subcarriers) may be extracted from the interpolated channel estimate ($H_{e\_pa}'$) by corresponding data subcarrier extraction logic 714.

In the EQ combiner 603, the extracted FCH pilot subcarriers ($Y_{fchp}$) may be divided by the extracted-corresponding-pilot preamble-derived channel estimate ($H_{e\_pa,xp}$) and the known normal boosting factor for the FCH pilots ($B_{n\_pscr}$) in an effort to remove the effects of the channel h and any known boosting factors. If $H_{e\_pa,xp}$ is an accurate estimate of the channel h at the particular subcarrier frequencies of interest, then $H_{e\_pa,xp}$ is approximately equal to H, and the resulting equalized FCH pilot signal ($R_{fchp}$) is $X_mB_z$ according to the following:

$$R_{fchp} = \frac{Y_{fchp}(=HX_mB_{n\_pscr}B_z)}{H_{e\_pa,xp}} \times \frac{1}{B_{n\_pscr}} = X_mB_z$$

Also in the EQ combiner 603, the extracted FCH data subcarriers ($Y_{fchd}$) may be divided by the extracted-corresponding-data preamble-derived channel estimate ($H_{e\_pa,xd}$) in an effort to remove the effects of the channel h. If $H_{e\_pa,xd}$ is an accurate estimate of the channel h at the particular subcarrier frequencies of interest, then $H_{e\_pa,xd}$ is approximately equal to H, and the resulting equalized FCH data signal ($R_{fchd}$) is $X_mB_z$ according to the following:

$$R_{fchd} = \frac{Y_{fchd}(=HX_mB_z)}{H_{e\_pa,xd}} = X_mB_z$$

Although a normal boosting factor is not typically applied to the FCH data subcarriers, such a known normal boosting factor could be divided out in a manner similar to the calculation for the equalized FCH pilot signal. Also, keep in mind that the message $X_m$ is different for the FCH pilots and data.

Once the equalized FCH pilot and data signals have been calculated, a normalization factor corresponding to zone boosting ($B_{z\_norm}$) may be calculated in any suitable manner. For example, the zone boosting normalization factor may be calculated according to the following:

$$B_{z\_norm} = \sqrt{\text{average\_power}(R_{fchp}; R_{fchd})}$$

In the power normalizer 716, the equalized FCH pilot and data signals may be normalized according to the following:

$$R_{fchp\_norm} = \frac{R_{fchp}}{B_{z\_norm}}$$

$$R_{fchd\_norm} = \frac{R_{fchd}}{B_{z\_norm}}$$

which should be approximately equal to the corresponding FCH pilot and data frequency-domain messages ($X_m$) in the transmitter 302.

Now that the wireless channel has been estimated and the boosting factors have been effectively removed, demapping, CSI, LLR calculations, and decoding may proceed using the extracted-corresponding-data preamble-derived channel estimate ($H_{e\_pa,xd}$) and the normalized FCH data signal ($R_{fchd\_norm}$) to determine the DLFP 412 from the accurately decoded FCH 410. For some embodiments, the CSI block 516 may use the normalized FCH pilot signal ($R_{fchp\_norm}$) instead of or in addition to the extracted-corresponding-data preamble-derived channel estimate ($H_{e\_pa,xd}$). One disadvantage of this method is the additional power normalization performed by the power normalizer 716 after equalization.

Exemplary Initial FCH Decoding Using FCH Pilots

Figure 8:
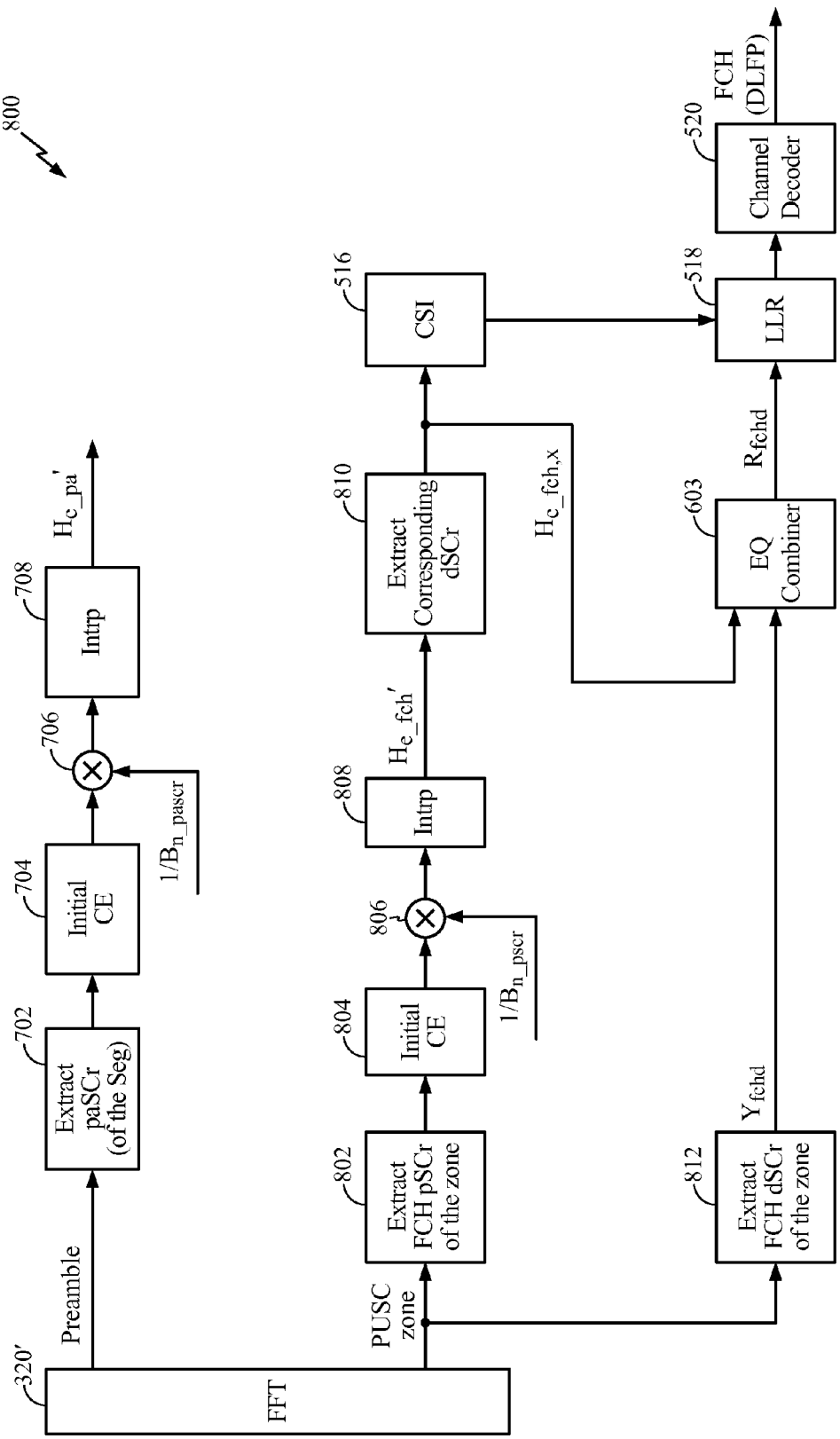
FIG. 8 illustrates initial FCH/DLFP decoding based on FCH pilots of an OFDM/A frame, in accordance with certain embodiments of the present disclosure.

FIG. 8 illustrates a block diagram 800 for another method of initial FCH/DLFP decoding, this one based on initial CE using the FCH pilots of the OFDM/A frame. Like the method of FIG. 7, the initial FCH/DLFP method of FIG. 8 does not need to know the used SCH bitmap 412a or the zone boosting factor, and the interpolated estimate of the channel h (He_pa') may be determined as described above.

From the DL-PUSC zone at the output of the FFT component 320', FCH pilot subcarriers may be extracted by FCH pSCr extraction logic 802. Initial CE logic 804 may perform channel estimation by dividing the extracted FCH pilot subcarriers ($Y_{fchp}$) by the known FCH pilots ($X_m$) from the transmitter 302. A multiplier 806 may be used to effectively divide the result by the known normal boosting factor for the FCH pilots ($B_{n\_pscr}$) in an effort to remove the normal boosting factor from the FCH pilot subcarriers ($Y_{fchp}$) according to the following:

$$H_{e\_fch} = \frac{Y_{fchp}(=HX_m B_{n\_pscr} B_z)}{X_m} \times \frac{1}{B_{n\_pscr}} = HB_z$$

where $H_{e\_fch}$ is the initial estimate of the channel h based on the FCH pilots with zone boosting applied.

An interpolator 808 may perform frequency and time interpolation of the initial channel estimate $H_{e\_fch}$ such that $H_{e\_fch}'$ is the interpolated channel estimate. In general for channel estimation, frequency interpolation may be used to estimate the frequency response of the subcarriers at frequencies between those of the pilot subcarriers, and time interpolation may be used to calculate the frequency response of the subcarriers for OFDM symbols between OFDM symbols composed of the pilot subcarriers. Any suitable interpolation technique, such as linear interpolation, may be used for the frequency and/or time interpolation.

For time interpolation within the interpolator 808, if the first OFDM symbol of the zone (i.e., the first FCH symbol) is being interpolated, then the interpolated preamble-based channel estimate ($H_{e\_pa}'$) and the initial CE for the second symbol of the zone (i.e., the second FCH symbol) may be used to derive the time-interpolated channel estimate for the first symbol. For any other symbol of the zone, the initial channel estimates for the symbols on either side of the current symbol (i.e., the $(n-1)^{th}$ symbol and the $(n+1)^{th}$ symbol) may be used to derive the time-interpolated channel estimate for the current symbol. Frequency interpolation may be performed using the resulting time-interpolated channel estimate.

Also from the DL-PUSC zone at the output of the FFT component 320', FCH data subcarriers may be extracted by FCH dSCr extraction logic 812. Once the interpolated $H_{e\_fch}'$ has been calculated, channel estimates ($H_{e\_fch,x}$) corresponding to the FCH data subcarriers ($Y_{fchd}$) may be extracted from the interpolated channel estimate ($H_{e\_fch}'$) by corresponding data subcarrier extraction logic 810. The EQ combiner 603 may equalize the extracted FCH data signals ($Y_{fchd}$) based on the extracted-corresponding-data channel estimate ($H_{e\_fch,x}$). If $H_{e\_fch,x}$ is an accurate estimate of the channel h at the particular subcarrier frequencies of interest, then the equalized FCH data signal ($R_{fchp}$) should be approximately equal to the FCH data subcarriers ($X_m$) from the transmitter 302 according to the following equation:

$$R_{fchd} = \frac{Y_{fchd}(=HX_m B_z)}{H_{e\_fch,x}} = X_m$$

Because the FCH-pilot-derived channel estimates included the zone boosting factor ($B_z$) and $B_z$ has already been removed by the EQ combiner 603, power normalization need not occur in this particular initial FCH/DLFP decoding scheme. Now that the wireless channel has been estimated and the boosting factors have been effectively removed, demapping, CSI, LLR calculations, and decoding may proceed using the extracted-corresponding-data channel estimate ($H_{e\_fch,x}$) and the equalized FCH data signal ($R_{fchd}$) to accurately decode the FCH 410 and hence, determine the DLFP 412.

Exemplary Initial FCH Decoding Using the Preamble and FCH Pilots

Figure 9:
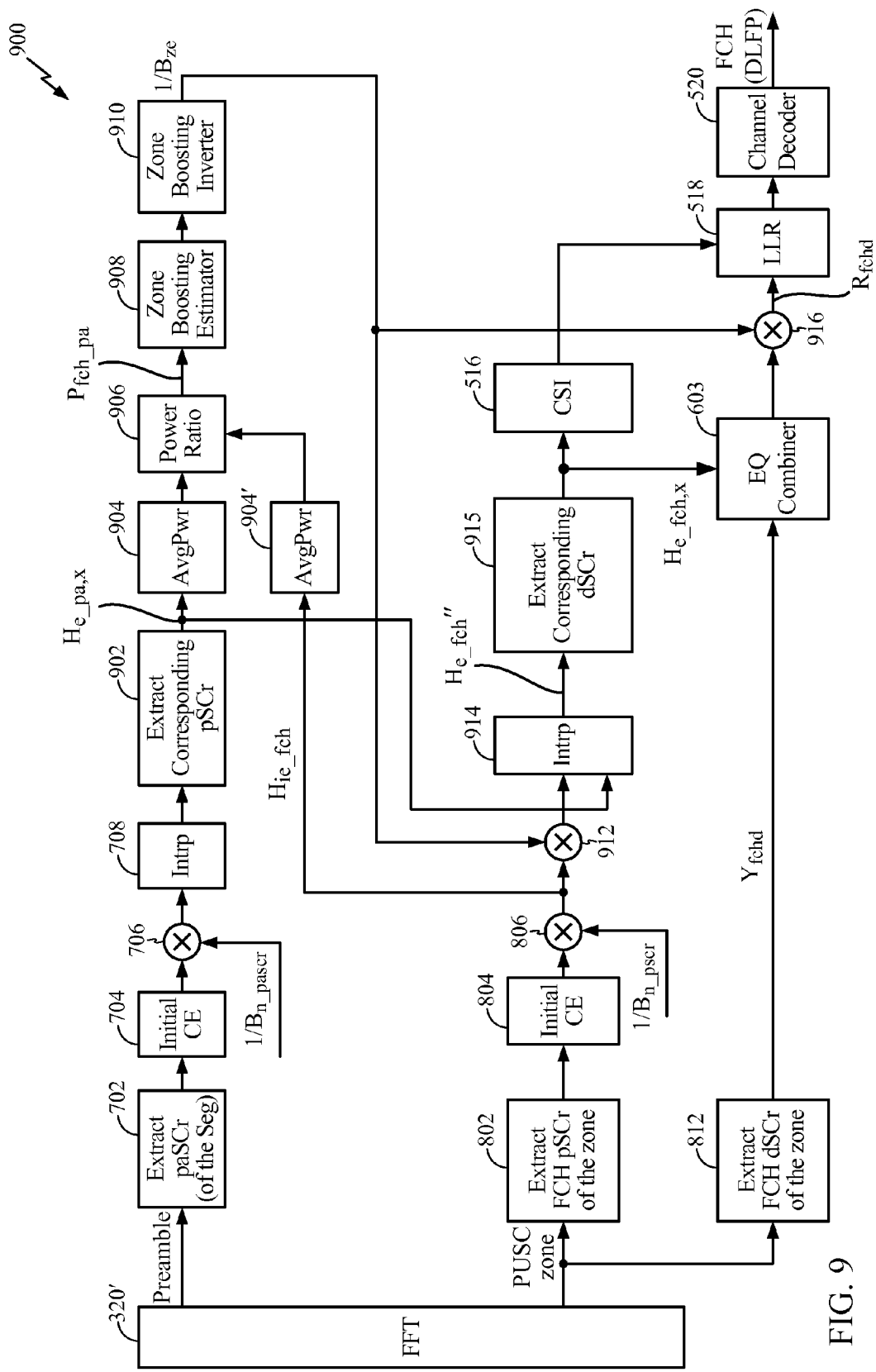
FIG. 9 illustrates initial FCH/DLFP decoding based on FCH pilots and on CE using the preamble of an OFDM/A frame, in accordance with certain embodiments of the present disclosure.

FIG. 9 illustrates a block diagram 900 for yet another method of initial FCH/DLFP decoding based on FCH pilots and on channel estimation (CE) using the preamble of an OFDM/A frame. Like the methods of FIGS. 7 and 8, the initial FCH/DLFP method of FIG. 9 does not need to know the used SCH bitmap 412a. In the method of FIG. 9, the zone boosting factor ($B_z$) may be estimated using any suitable technique, such as trial and error or a power measurement with a decision. The initial FCH decoding scheme associated with FIG. 9 may lead to a more accurate FCH than the scheme of FIG. 8, but the scheme of FIG. 9 is more complex and has additional calculation steps.

The interpolated estimate of the channel h ($H_{e\_pa}'$) may be determined as described above with respect to FIG. 7. An initial channel estimate ($H_{ie\_fch}$) based on the extracted FCH pilot subcarriers ($Y_{fchp}$) may be determined in a manner similar to the determination of $H_{e\_fch}$ using the extraction logic 802, the initial CE logic 804, and the multiplier 806 of FIG. 8 according to the following:

$$H_{ie\_fch} = \frac{Y_{fchp}(=HX_m B_{n\_pscr} B_z)}{X_m} \times \frac{1}{B_{n\_pscr}} = HB_z$$

where $H_{ie\_fch}$ is the initial estimate of the channel h based on the FCH pilots with zone boosting ($B_z$) applied. Channel estimates ($H_{e\_pa,x}$) corresponding to the extracted FCH pilot subcarriers ($Y_{fchp}$) may be extracted from the interpolated channel estimate ($H_{e\_pa}'$) by corresponding pilot subcarrier extraction logic 902.

Average power calculation logic 904 may calculate the average power of the extracted-corresponding-pilot preamble-based channel estimate ($H_{e\_pa,x}$), average power calculation logic 904' may calculate the average power of the FCH-pilot-based channel estimate ($H_{ie\_fch}$), and power ratio logic 906 may calculate the power ratio ($P_{fch\_pa}$) between the FCH-pilot-based and the extracted-corresponding-pilot preamble-based channel estimates according to the following:

$$P_{fch\_pa} = \frac{\text{mean}(|H_{ie\_fch}|^2)}{\text{mean}(|H_{e\_pa,x}|^2)} = |B_z|^2$$

To estimate the zone boosting factor ($B_z$), the zone boosting estimator 908 may take the square root of the power ratio ($P_{fch\_pa}$), and the result ($B_{fch\_pa}$) may be compared against all possible zone boosting factors to find the zone boosting factor nearest to $B_{fch\_pa}$. The nearest possible zone boosting factor may be selected as the estimated zone boosting factor ($B_{ze}$) according to the following equations performed in the zone boosting estimator 908:

$$B_{fch\_pa} = \sqrt{P_{fch\_pa}} = B_z$$

$$B_{ze} = \text{Nearest}(B_{fch\_pa}, \text{All Possible } B_z)$$

For some embodiments, the estimated zone boosting factor may be set equal to the square root ($B_{fch\_pa}$) of the power ratio.

A zone boosting inverter 910 may take the multiplicative inverse of the estimated zone boosting factor ($B_{ze}$). A multiplier 912 may multiply the inverse ($1/B_{ze}$) with the FCH-pilot-based channel estimate ($H_{ie\_fch}$) in an effort to normalize and remove the boosting factor from $H_{ie\_fch}$ according to the following:

$$H_{ie\_fch\_norm} = \frac{H_{ie\_fch}}{B_{ze}} = H$$

where $H_{ie\_fch\_norm}$ is the normalized FCH-pilot-based channel estimate and should be approximately equal to the channel transfer function H.

A second interpolator 914 may perform time and frequency interpolation using either one or both of the channel estimates $H_{e\_pa,x}$ and $H_{ie\_fch\_norm}$ according to the following:

$$H''_{e\_fch} = \text{Interpolation}([H_{e\_pa,x}; H_{ie\_fch\_norm}])$$
$$= H$$

The interpolated result ($H_{e\_fch}''$) is designated as the single channel estimate for initial FCH decoding, which may be a more accurate channel estimate closer to the actual wireless channel transfer function H than either of the channel estimates $H_{e\_pa,x}$ and $H_{ie\_fch\_norm}$. Any suitable interpolation technique, such as linear interpolation, may be used for the time and/or frequency interpolation.

For example, to interpolate the first symbol of the FCH 410 (i.e., symbol 1), the second interpolator 914 may use (a) the channel estimate for the preamble, or symbol 0, (b) the initial channel estimate (i.e., the channel estimate in the pilot position) for symbol 1, and (c) the initial channel estimate for the second symbol of the FCH 410 (i.e., symbol 2). Interpolation may be performed in time on (a), (b), and (c) to generate (b'), a time-interpolated first symbol of the FCH 410. The time-interpolated symbol 1 (b') may then be frequency-interpolated to provide frequency responses of the wireless channel corresponding to missing subcarrier frequencies of interest.

Also from the DL-PUSC zone at the output of the FFT component 320', FCH data subcarriers may be extracted by FCH dSCr extraction logic 812. Once the interpolated $H_{e\_fch}''$ has been calculated, a channel estimate ($H_{e\_fch,x}$) corresponding to the FCH data subcarriers ($Y_{fchd}$) may be extracted from the interpolated channel estimate ($H_{e\_fch}''$) by corresponding data subcarrier extraction logic 915. The EQ combiner 603 may equalize the extracted FCH data signals ($Y_{fchd}$) based on the extracted-corresponding-data channel estimate ($H_{e\_fch,x}$)), and a multiplier 916 may effectively divide the result by the estimated zone boosting factor ($B_{ze}$) in an effort to remove the zone boosting factor from the FCH data signal. If $H_{e\_fch,x}$ is an accurate estimate of the channel h at the particular subcarrier frequencies of interest, then the equalized FCH data signal ($R_{fchp}$) should be approximately equal to the FCH data subcarriers ($X_m$) from the transmitter 302 according to the following equation:

$$R_{fchd} = \frac{Y_{fchd}(= HX_mB_z)}{H_{e\_fch,x}} \times \frac{1}{B_{ze}} = X_m$$

Because the zone boosting factor ($B_z$) has already been removed by the multiplier 916 (or the EQ combiner 603 for some embodiments), power normalization need not occur in the initial FCH/DLFP decoding scheme associated with FIG. 9. Now that the wireless channel has been estimated and the boosting factors have been effectively removed, demapping, CSI, LLR calculations, and decoding may proceed using the extracted-corresponding-data channel estimate ($H_{e\_fch,x}$) for initial FCH decoding and the equalized FCH data signal ($R_{fchd}$) to accurately decode the FCH 410 and hence, determine the DLFP 412.

For some embodiments, instead of estimating the zone boosting factor according to the power ratio ($P_{fch\_pa}$), a trial-and-error approach using different zone boosting factors may be employed. Since all of the possible zone boosting factors ($B_z$) may be known, one of these may be selected for use as the estimated zone boosting factor ($B_{ze}$) in the equations above. Initial FCH/DLFP decoding may proceed as described above with respect to FIG. 9. The decoded FCH may be checked, and if the decoded FCH is incorrect, the process may repeat with a different possible zone boosting factor selected as the estimated zone boosting factor ($B_{ze}$). If the decoded FCH is correct such that the DLFP 412 may be interpreted, the decoding of the OFDM/A frame may proceed, starting with the decoding of the DL MAP 414. This trial-and-error approach may cause a latency issue in the initial FCH decoding, however.

Exemplary Selection of Initial FCH Decoding

A device may be capable of performing any combination of one or more initial FCH/DLFP decoding methods presented above. Being based on initial channel estimation (CE) using the preamble 408 of an OFDM/A frame directly, the initial FCH/DLFP decoding method associated with the block diagram 700 of FIG. 7 directly may offer fast FCH decoding. Associated with the block diagram 800 of FIG. 8, the initial FCH/DLFP decoding method based on initial CE using the FCH pilots of the OFDM/A frame may be used for simple FCH decoding without knowledge of the zone boosting factor ($B_z$). The initial FCH/DLFP decoding method associated with the block diagram 900 of FIG. 9 and based on FCH pilots and on channel estimation using the preamble of an OFDM/A frame may provide the best performance by interpolating the channel in the preamble and the channel in the next symbol of the FCH.

From the standpoint of decoding accuracy, the method of FIG. 9 may be the best choice of the three methods, but the most complicated. When considering decoding speed, the method of FIG. 7 may be the best choice, although there may be some accuracy loss and an additional power normalization block may be employed to cancel the zone boosting factor ($B_z$) in later stages. For ease of implementation, the method of FIG. 8 may be the most suitable with no need to estimate the zone boosting factor ($B_z$), although there may be some accuracy loss compared to the method of FIG. 9.

Exemplary Overall Initial FCH Decoding

Figure 10:
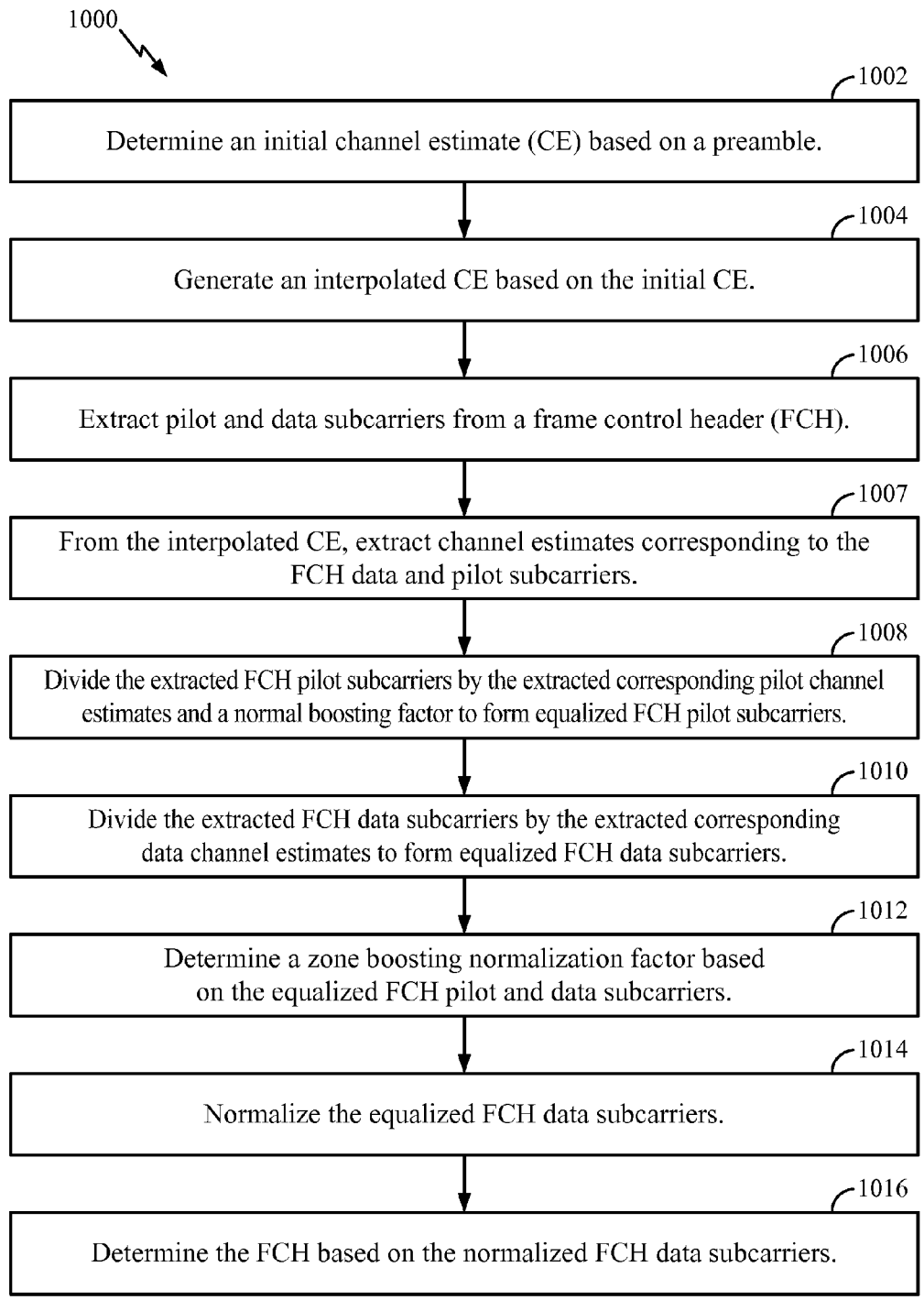
FIG. 10 is a flow chart of example operations for initial FCH/DLFP decoding based on CE using the preamble of an OFDM/A frame, in accordance with certain embodiments of the present disclosure.

FIG. 10 illustrates a flow diagram of example operations 1000 for initial FCH decoding based on the preamble of an OFDM/OFDMA frame. The operations may begin, at 1002, by determining an initial CE based on the preamble of an OFDM/A frame received via a wireless channel. At 1004, an interpolated CE based on the initial CE may be generated, for example, by estimating frequency responses of the wireless channel for subcarriers not included in the initial CE (i.e., subcarriers that are not preamble pilot subcarriers) as described above. Pilot and data subcarriers may be extracted from the FCH at 1006, and from the interpolated CE, channel estimates corresponding to both the FCH pilot and data subcarriers may be extracted at 1007.

At 1008, the extracted FCH pilot subcarriers may be divided by the extracted channel estimates corresponding to the FCH pilot subcarriers and a normal boosting factor in an effort to generate equalized FCH pilot subcarriers. At 1010, the extracted FCH data subcarriers may be divided by the extracted channel estimates corresponding to the FCH data subcarriers in an effort to generate equalized FCH data subcarriers. A normalization factor corresponding to zone boosting may be determined at 1012 based on the equalized FCH pilot subcarriers and the equalized FCH data subcarriers. At 1014, the equalized FCH data subcarriers may be divided by the zone boosting normalization factor in an effort to normalize the equalized FCH data subcarriers, and the FCH may be determined based on the normalized FCH data subcarriers at 1016.

Figure 10A:
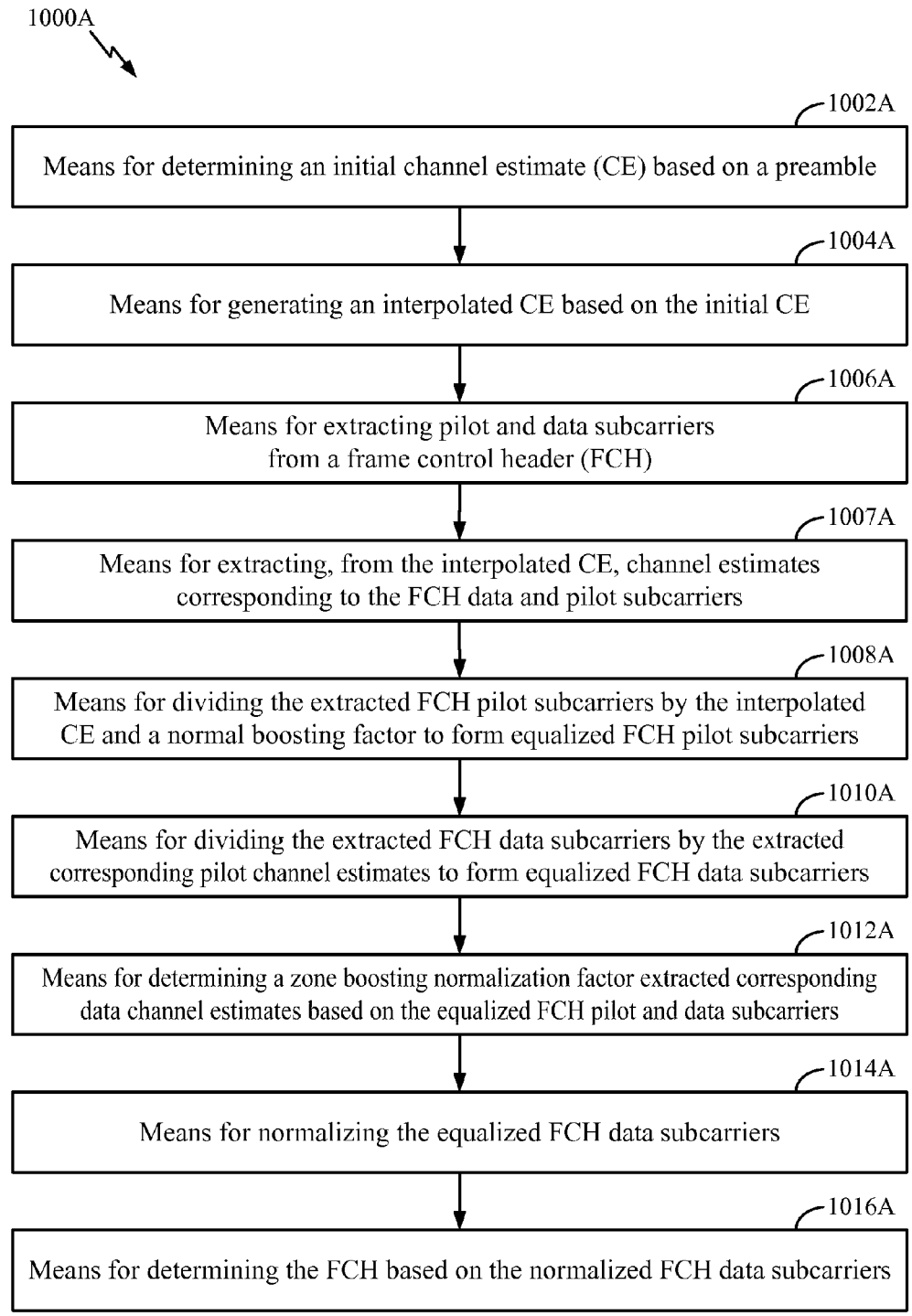
FIG. 10A is a block diagram of means corresponding to the example operations for initial FCH/DLFP decoding of FIG. 10, in accordance with certain embodiments of the present disclosure.

The operations 1000 of FIG. 10 described above may be performed by various hardware and/or software component(s) and/or module(s) corresponding to the means-plus-function blocks 1000A illustrated in FIG. 10A. In other words, blocks 1002 through 1016 illustrated in FIG. 10 correspond to means-plus-function blocks 1002A through 1016A illustrated in FIG. 10A.

Figure 11:
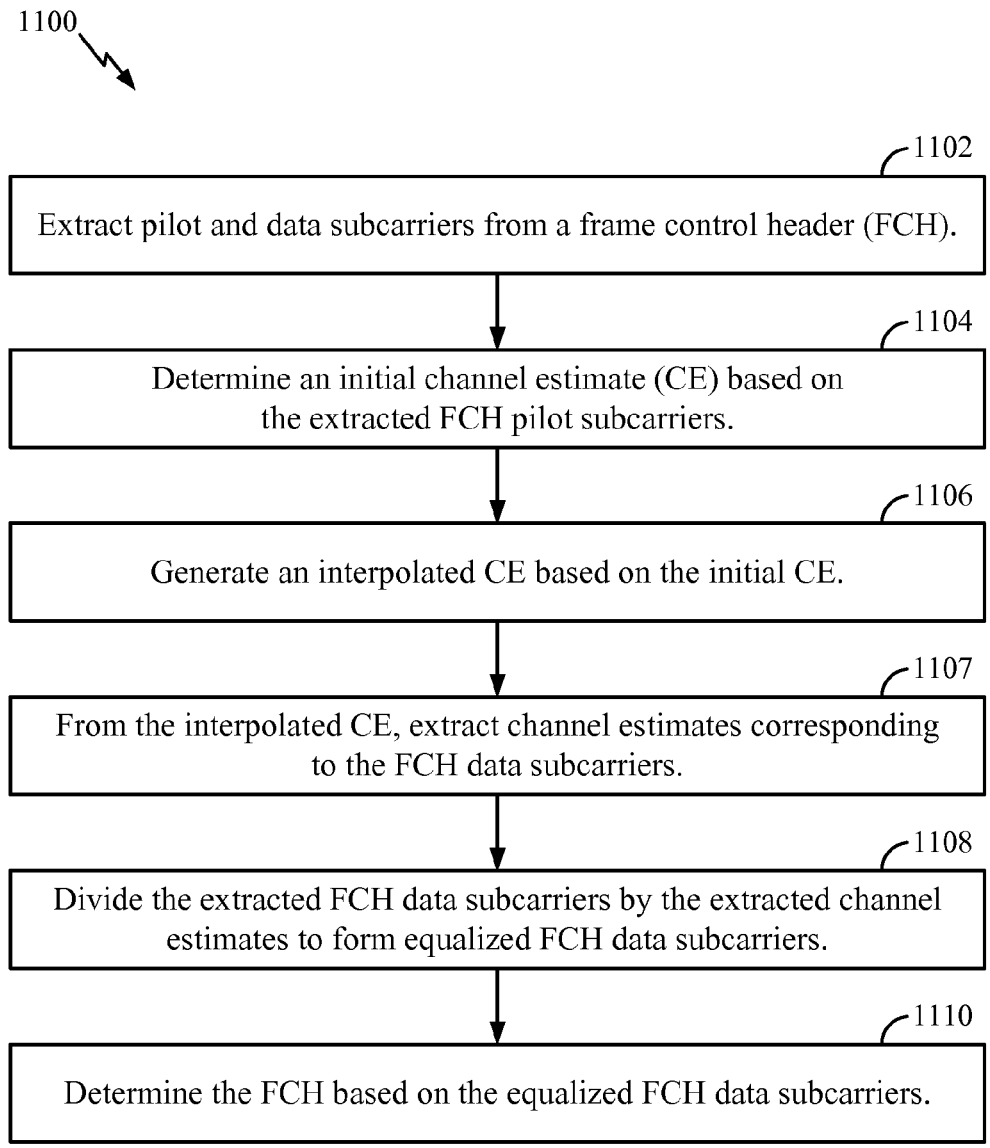
FIG. 11 is a flow chart of example operations for initial FCH/DLFP decoding based on FCH pilots of an OFDM/A frame, in accordance with certain embodiments of the present disclosure.

FIG. 11 illustrates a flow diagram of example operations 1100 for initial FCH decoding based on FCH pilots of an OFDM/OFDMA frame. The operations may begin, at 1102, by extracting pilot and data subcarriers from the FCH of a received OFDM/A signal. An initial CE based on the extracted FCH pilot subcarriers may be determined at 1104. At 1106, an interpolated CE based on the initial CE may be generated, for example, by estimating frequency responses of the wireless channel for the extracted FCH data subcarriers as described above. Once the interpolated CE has been generated, channel estimates corresponding to the FCH data subcarriers may be extracted from it at 1107. The extracted FCH data subcarriers may be divided at 1108 by the extracted channel estimates corresponding to the FCH data subcarriers in an effort to form equalized FCH data subcarriers, and the FCH may be determined based on the equalized FCH data subcarriers at 1110.

Figure 11A:
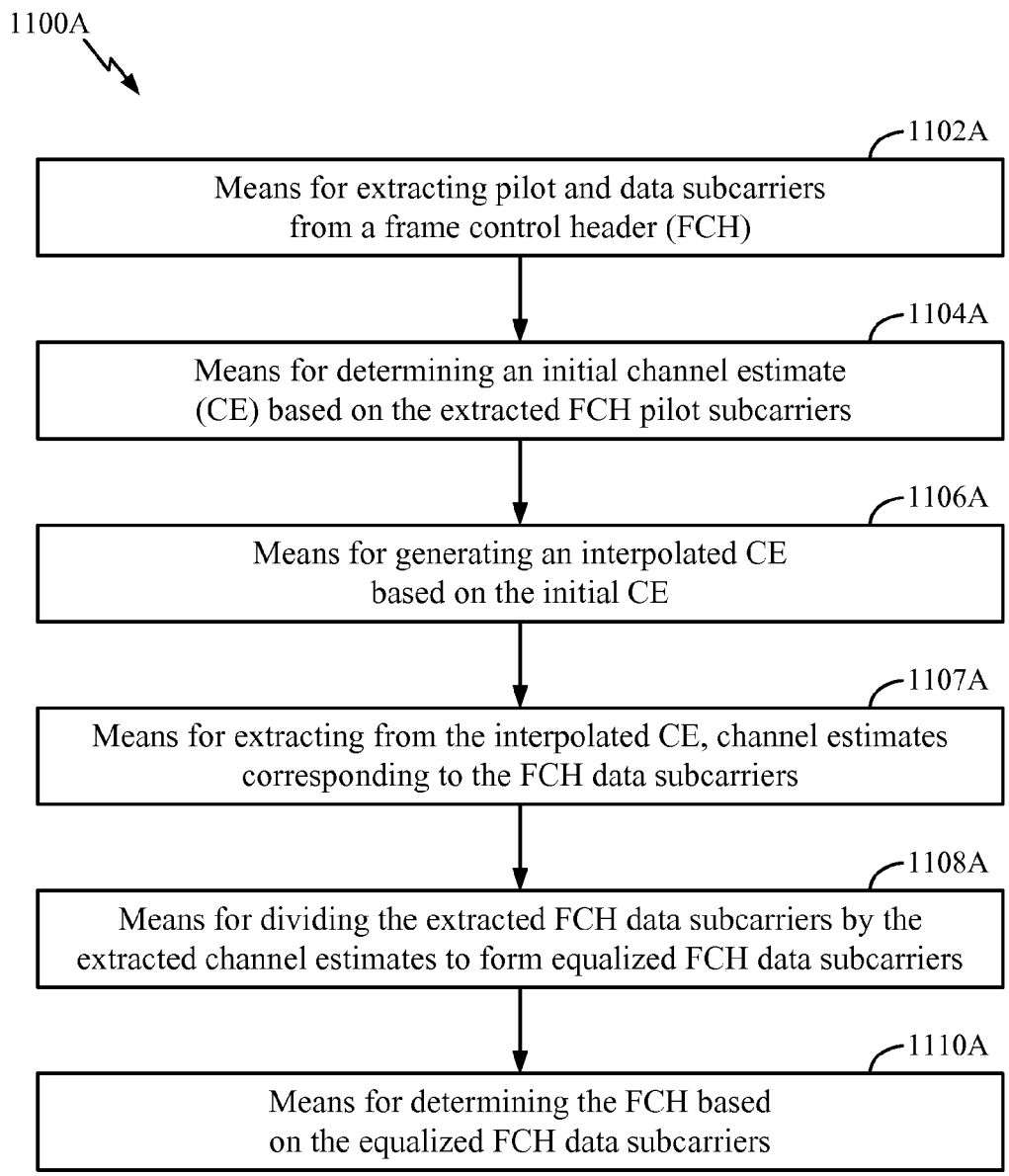
FIG. 11A is a block diagram of means corresponding to the example operations for initial FCH/DLFP decoding of FIG. 11, in accordance with certain embodiments of the present disclosure.

The operations 1100 of FIG. 11 described above may be performed by various hardware and/or software component(s) and/or module(s) corresponding to the means-plus-function blocks 1100A illustrated in FIG. 11A. In other words, blocks 1102 through 1110 illustrated in FIG. 11 correspond to means-plus-function blocks 1102A through 1110A illustrated in FIG. 11A.

Figure 12:
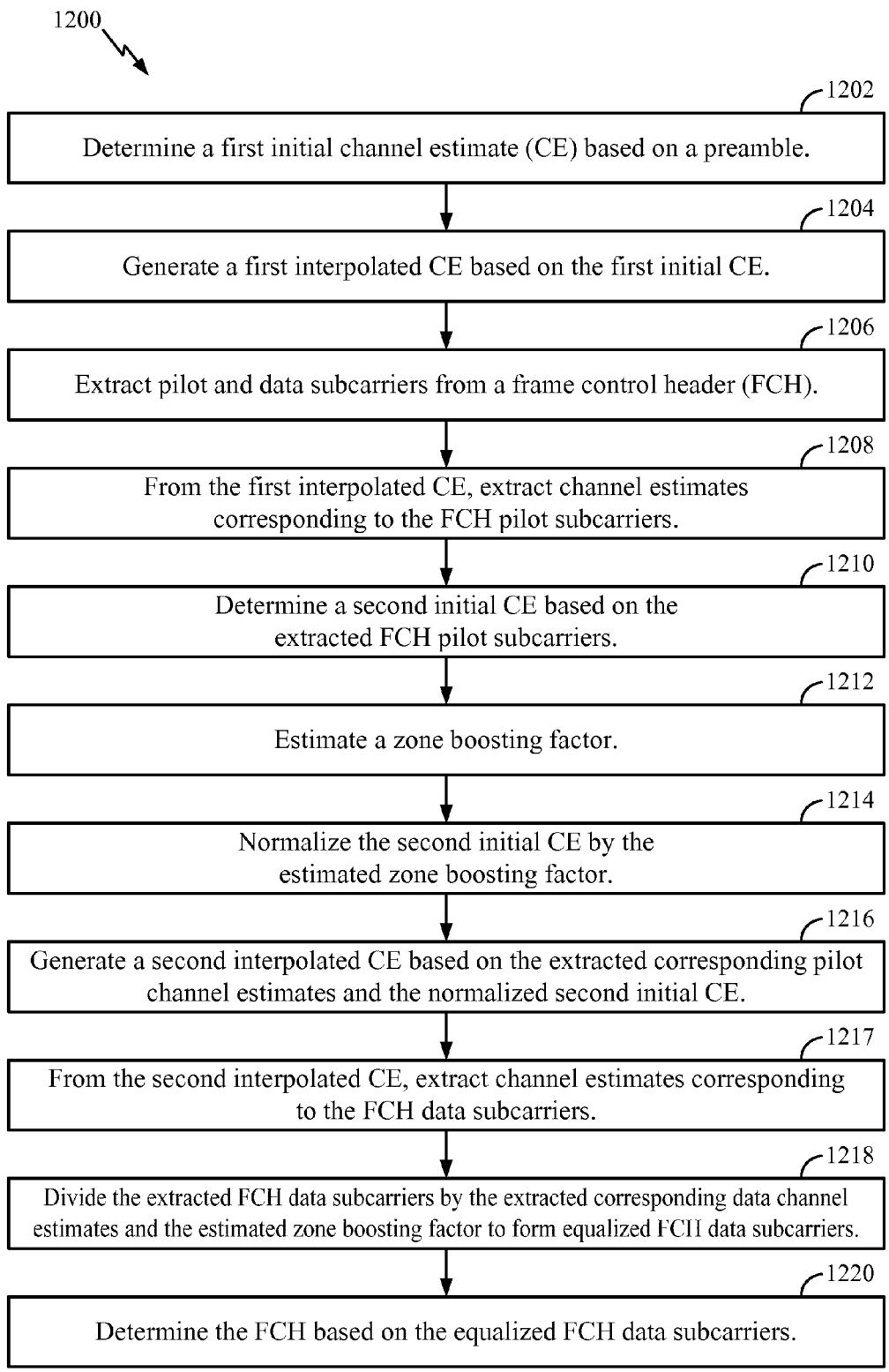
FIG. 12 is a flow chart of example operations for initial FCH/DLFP decoding based on FCH pilots and on CE using the preamble of an OFDM/A frame, in accordance with certain embodiments of the present disclosure.

FIG. 12 illustrates a flow diagram of example operations 1200 for initial FCH decoding based on FCH pilots and on channel estimation using the preamble of an OFDM/OFDMA frame. The operations may begin, at 1202, by determining a first initial CE based on the preamble of an OFDM/A frame received via a wireless channel. At 1204, a first interpolated CE based on the first initial CE may be generated, for example, by estimating frequency responses of the wireless channel for subcarriers not included in the first initial CE (i.e., subcarriers that are not preamble pilot subcarriers) as described above.

Pilot and data subcarriers may be extracted from the FCH at 1206, and from the first interpolated CE, channel estimates corresponding to the FCH pilot subcarriers may be extracted at 1208. At 1210, a second initial CE based on the extracted FCH pilot subcarriers may be determined. A zone boosting factor may be estimated at 1212, and at 1214, the second initial CE may be normalized by the estimated zone boosting factor.

At 1216, a second interpolated CE based on the extracted channel estimates corresponding to the FCH pilot subcarriers and on the normalized second initial CE may be generated, for example, as described above with respect to the interpolator 914. Once the second interpolated CE has been generated, channel estimates corresponding to the FCH data subcarriers may be extracted from it at 1217. The extracted FCH data subcarriers from 1206 may be divided at 1218 by the extracted channel estimates corresponding to the FCH data subcarriers and the estimated zone boosting factor in an effort to form equalized FCH data subcarriers. The FCH may be determined based on the equalized FCH data subcarriers at 1220.

Figure 12A:
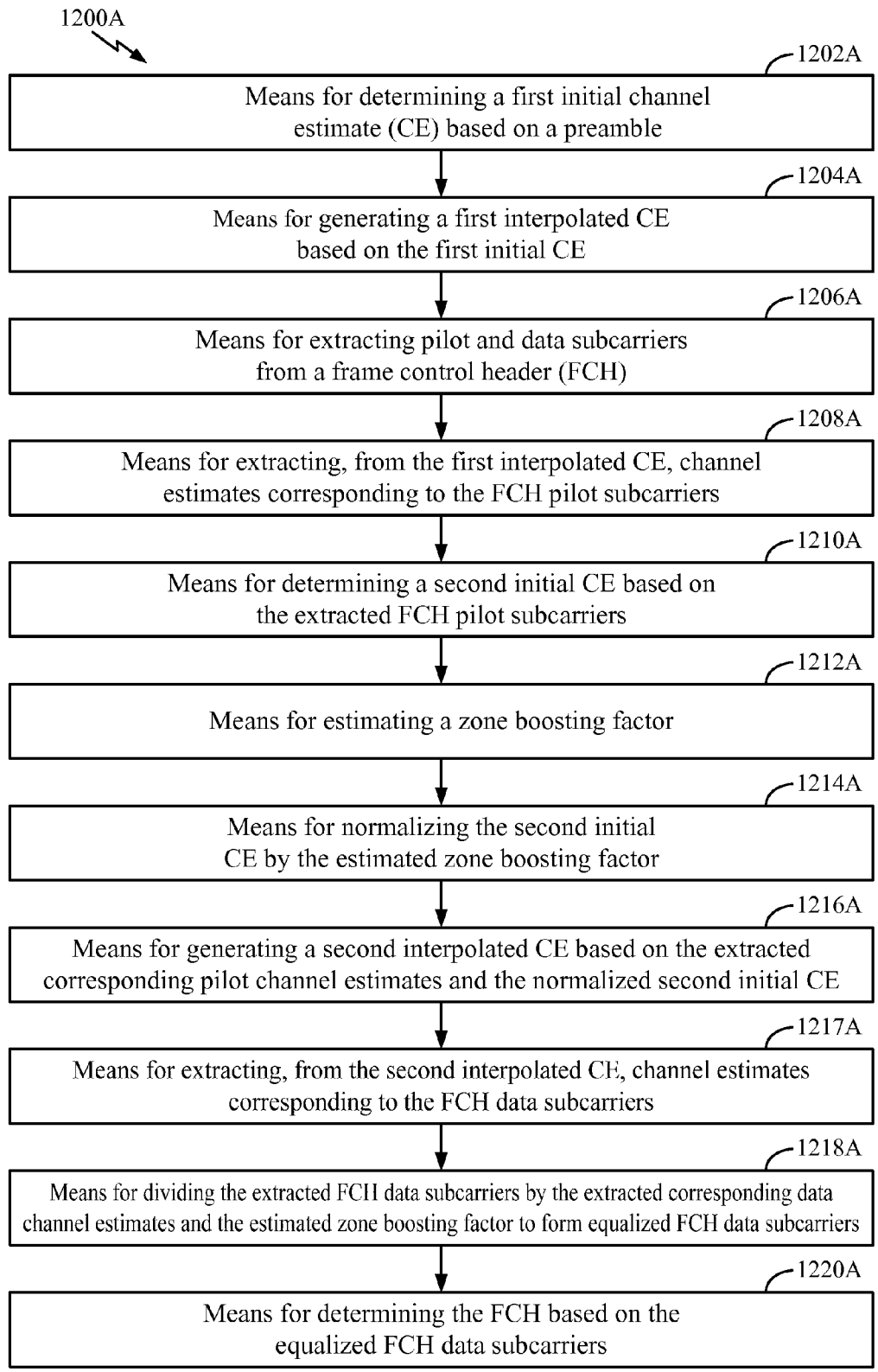
FIG. 12A is a block diagram of means corresponding to the example operations for initial FCH/DLFP decoding of FIG. 12, in accordance with certain embodiments of the present disclosure.

The operations 1200 of FIG. 12 described above may be performed by various hardware and/or software component(s) and/or module(s) corresponding to the means-plus-function blocks 1200A illustrated in FIG. 12A. In other words, blocks 1202 through 1220 illustrated in FIG. 12 correspond to means-plus-function blocks 1202A through 1220A illustrated in FIG. 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions or sets of instructions on a computer-readable medium or storage medium. A storage media may be any available media that can be accessed by a computer, or one or more instruction processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), High Definition DVD (HD DVD®), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
    extracting pilot and data subcarriers from a frame control header (FCH) of a signal received via a wireless channel;
    determining an initial channel estimate (CE) based on the extracted FCH pilot subcarriers by dividing the extracted FCH pilot subcarriers of the received signal by known FCH pilot subcarriers and a normal boosting factor corresponding to the FCH pilot subcarriers, wherein the initial CE is approximately equal to a frequency response of the wireless channel multiplied with a zone boosting factor of a PUSC (partial usage of subchannels) zone;
    generating an interpolated CE based on the initial CE by estimating frequency responses of the channel for the extracted FCH data subcarriers;
    from the interpolated CE, extracting a channel estimate corresponding to the FCH data subcarriers;
    dividing the extracted FCH data subcarriers by the extracted channel estimate to form equalized FCH data subcarriers; and
    determining the FCH based on the equalized FCH data subcarriers.

2. The method of claim 1, wherein generating the interpolated CE involves linear interpolation between elements of the initial CE associated with the extracted FCH pilot subcarriers in at least one of time and frequency.

3. A non-transitory computer-readable medium containing a program for initially decoding a frame control header (FCH), which, when executed by a processor, performs operations comprising:
    extracting pilot and data subcarriers from the FCH of a signal received via a wireless channel;
    determining an initial channel estimate (CE) based on the extracted FCH pilot subcarriers by dividing the extracted FCH pilot subcarriers of the received signal by known FCH pilot subcarriers and a normal boosting factor corresponding to the FCH pilot subcarriers, wherein the initial CE is approximately equal to a frequency response of the wireless channel multiplied with a zone boosting factor of a PUSC (partial usage of subchannels) zone;
    generating an interpolated CE based on the initial CE by estimating frequency responses of the channel for the extracted FCH data subcarriers;
    from the interpolated CE, extracting a channel estimate corresponding to the FCH data subcarriers;
    dividing the extracted FCH data subcarriers by the extracted channel estimate to form equalized FCH data subcarriers; and determining the FCH based on the equalized FCH data subcarriers.

4. An apparatus for wireless communication, comprising:
means for extracting pilot and data subcarriers from a frame control header (FCH) of a signal received via a wireless channel;
means for determining an initial channel estimate (CE) based on the extracted FCH pilot subcarriers by dividing the extracted FCH pilot subcarriers of the received signal by known FCH pilot subcarriers and a normal boosting factor corresponding to the FCH pilot subcarriers, wherein the initial CE is approximately equal to a frequency response of the wireless channel multiplied with a zone boosting factor of a PUSC (partial usage of subchannels) zone;
means for generating an interpolated CE based on the initial CE by estimating frequency responses of the channel for the extracted FCH data subcarriers;
means for extracting, from the interpolated CE, a channel estimate corresponding to the FCH data subcarriers;
means for dividing the extracted FCH data subcarriers by the extracted channel estimate to form equalized FCH data subcarriers; and
means for determining the FCH based on the equalized FCH data subcarriers.

5. A receiver for wireless communication, comprising:
subcarrier extraction logic configured to extract pilot and data subcarriers from a frame control header (FCH) of a signal received via a wireless channel;
initial channel estimation logic configured to determine an initial channel estimate (CE) based on the extracted FCH pilot subcarriers by dividing the extracted FCH pilot subcarriers of the received signal by known FCH pilot subcarriers and a normal boosting factor corresponding to the FCH pilot subcarriers, wherein the initial CE is approximately equal to a frequency response of the wireless channel multiplied with a zone boosting factor of a PUSC (partial usage of subchannels) zone;
interpolation logic configured to generate an interpolated CE based on the initial CE by estimating frequency responses of the channel for the extracted FCH data subcarriers;
CE extraction logic configured to extract, from the interpolated CE, a channel estimate corresponding to the FCH data subcarriers;
division logic configured to divide the extracted FCH data subcarriers by the extracted channel estimate to form equalized FCH data subcarriers; and
interpretation logic configured to determine the FCH based on the equalized FCH data subcarriers.

6. The receiver of claim 5, wherein the interpretation logic comprises at least one of channel state information (CSI) logic, log likelihood ratio (LLR) logic, and channel decoding logic configured to decode the FCH.

7. A mobile device, comprising:
a receiver front end for receiving a signal transmitted via a wireless channel;
subcarrier extraction logic configured to extract pilot and data subcarriers from a frame control header (FCH) of the received signal;
initial channel estimation logic configured to determine an initial channel estimate (CE) based on the extracted FCH pilot subcarriers by dividing the extracted FCH pilot subcarriers of the received signal by known FCH pilot subcarriers and a normal boosting factor corresponding to the FCH pilot subcarriers, wherein the initial CE is approximately equal to a frequency response of the wireless channel multiplied with a zone boosting factor of a PUSC (partial usage of subchannels) zone;
interpolation logic configured to generate an interpolated CE based on the initial CE by estimating frequency responses of the channel for the extracted FCH data subcarriers;
CE extraction logic configured to extract, from the interpolated CE, a channel estimate corresponding to the FCH data subcarriers;
division logic configured to divide the extracted FCH data subcarriers by the extracted channel estimate to form equalized FCH data subcarriers; and
interpretation logic configured to determine the FCH based on the equalized FCH data subcarriers.

8. A method comprising:
extracting pilot and data subcarriers from a frame control header (FCH) of a signal received via a wireless channel;
determining an initial channel estimate (CE) based on the extracted FCH pilot subcarriers;
generating an interpolated CE based on the initial CE by estimating frequency responses of the channel for the extracted FCH data subcarriers;
from the interpolated CE, extracting a channel estimate corresponding to the FCH data subcarriers;
dividing the extracted FCH data subcarriers by the extracted channel estimate to form equalized FCH data subcarriers;
determining the FCH based on the equalized FCH data subcarriers;
extracting a zone boosting factor of a PUSC (partial usage of subchannels) zone from the determined FCH; and
decoding the FCH again or decoding another FCH of another signal received via the wireless channel, based on the extracted zone boosting factor.

9. A non-transitory computer-readable medium containing a program for initially decoding a frame control header (FCH), which, when executed by a processor, performs operations comprising:
extracting pilot and data subcarriers from the FCH of a signal received via a wireless channel;
determining an initial channel estimate (CE) based on the extracted FCH pilot subcarriers;
generating an interpolated CE based on the initial CE by estimating frequency responses of the channel for the extracted FCH data subcarriers;
from the interpolated CE, extracting a channel estimate corresponding to the FCH data subcarriers;
dividing the extracted FCH data subcarriers by the extracted channel estimate to form equalized FCH data subcarriers;
determining the FCH based on the equalized FCH data subcarriers;
extracting a zone boosting factor of a PUSC (partial usage of subchannels) zone from the determined FCH; and
decoding the FCH again or decoding another FCH of another signal received via the wireless channel, based on the extracted zone boosting factor.

10. An apparatus for wireless communication, comprising:
means for extracting pilot and data subcarriers from a frame control header (FCH) of a signal received via a wireless channel;
means for determining an initial channel estimate (CE) based on the extracted FCH pilot subcarriers;
means for generating an interpolated CE based on the initial CE by estimating frequency responses of the channel for the extracted FCH data subcarriers;

means for extracting, from the interpolated CE, a channel estimate corresponding to the FCH data subcarriers;

means for dividing the extracted FCH data subcarriers by the extracted channel estimate to form equalized FCH data subcarriers;

means for determining the FCH based on the equalized FCH data subcarriers;

means for extracting a zone boosting factor of a PUSC (partial usage of subchannels) zone from the determined FCH; and means for decoding the FCH again or means for decoding another FCH of another signal received via the wireless channel, based on the extracted zone boosting factor.

11. A receiver for wireless communication, comprising:

subcarrier extraction logic configured to extract pilot and data subcarriers from a frame control header (FCH) of a signal received via a wireless channel;

initial channel estimation logic configured to determine an initial channel estimate (CE) based on the extracted FCH pilot subcarriers;

interpolation logic configured to generate an interpolated CE based on the initial CE by estimating frequency responses of the channel for the extracted FCH data subcarriers;

CE extraction logic configured to extract, from the interpolated CE, a channel estimate corresponding to the FCH data subcarriers;

division logic configured to divide the extracted FCH data subcarriers by the extracted channel estimate to form equalized FCH data subcarriers;

interpretation logic configured to determine the FCH based on the equalized FCH data subcarriers;

zone boosting factor extraction logic configured to extract a zone boosting factor of a PUSC (partial usage of subchannels) zone from the determined FCH; and decoding logic configured to decode the FCH again or to decode another FCH of another signal received via the wireless channel, based on the extracted zone boosting factor.

* * * * *